United States Patent [19]

Hashimoto

[11] Patent Number: 5,113,439
[45] Date of Patent: May 12, 1992

[54] CATV TERMINAL AND VIDEO APPARATUS HAVING A NOISE ELIMINATING CIRCUIT

[75] Inventor: Takashi Hashimoto, Tokyo, Japan

[73] Assignee: Pioneer Electronic Corporation, Tokyo, Japan

[21] Appl. No.: 489,293

[22] Filed: Mar. 5, 1990

[30] Foreign Application Priority Data

Sep. 28, 1989 [JP] Japan .................. 1-250627
Sep. 28, 1989 [JP] Japan .................. 1-250628

[51] Int. Cl.$^5$ ........................................... H04N 7/167
[52] U.S. Cl. ............................................ 380/7; 380/20; 358/36
[58] Field of Search ............... 380/7, 15, 20; 358/36, 358/37, 340, 155, 166, 167, 171, 172, 173, 177

[56] References Cited

U.S. PATENT DOCUMENTS

| | | |
|---|---|---|
| 3,873,768 | 3/1975 | Klein . |
| 3,947,631 | 3/1976 | Rhee et al. .................. 358/167 |
| 4,074,321 | 2/1978 | Miller ........................... 358/37 X |
| 4,096,516 | 6/1978 | Pritach ......................... 358/37 X |
| 4,189,755 | 2/1980 | Balbes et al. . |
| 4,295,161 | 10/1981 | Hettiger . |
| 4,377,823 | 3/1983 | Mycynek . |
| 4,496,978 | 1/1985 | Sakamoto et al. .......... 358/155 |
| 4,554,588 | 11/1985 | Shanley, II .................. 358/74 X |
| 4,626,890 | 12/1986 | Ryan . |
| 4,691,353 | 9/1987 | Farmer ......................... 380/15 |
| 4,725,882 | 2/1988 | Sato et al. .................... 380/10 X |
| 4,768,094 | 8/1988 | Ichinoi ......................... 358/167 |
| 4,882,618 | 11/1989 | Tsuji ............................. 358/167 |
| 4,928,165 | 5/1990 | Kisou ........................... 358/167 X |

FOREIGN PATENT DOCUMENTS 2737749 3/1979 Netherlands .
806646 12/1958 United Kingdom .
2123244 1/1984 United Kingdom .

*Primary Examiner*—Tod Swann
*Attorney, Agent, or Firm*—Sughrue, Mion, Zinn, Macpeak & Seas

[57] ABSTRACT

In a CATV terminal or a video apparatus such as a TV receiver, noises superimposed on a DC part of a horizontal synchronizing signal of a video signal are eliminated by integrating the DC part or replacing the DC part with an appropriate constant voltage. Noises superimposed on a back porch portion of the video signal are eliminated in the similar manner by subjecting a luminance signal which has been separated from the video signal to the noise eliminating operation.

21 Claims, 18 Drawing Sheets

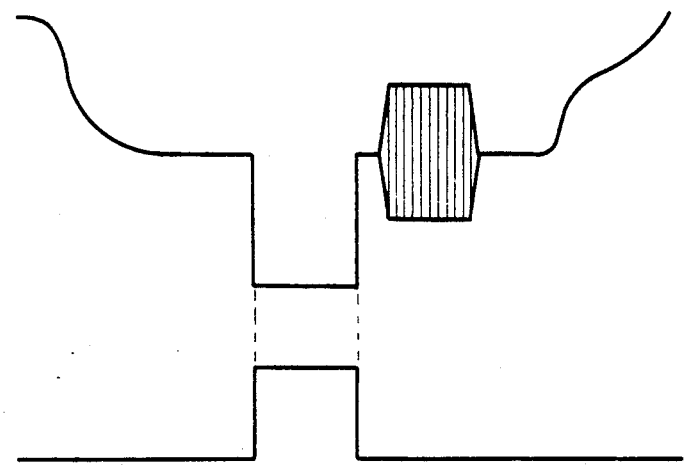
FIG. 7(a)
FIG. 7(b)
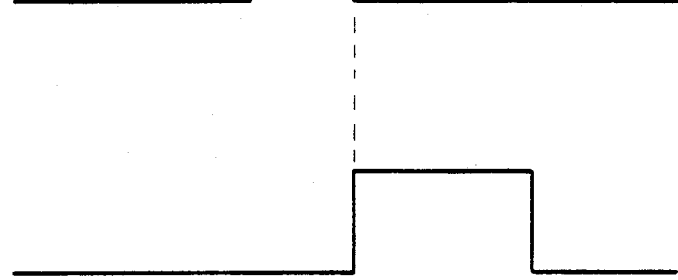
FIG. 7(c)
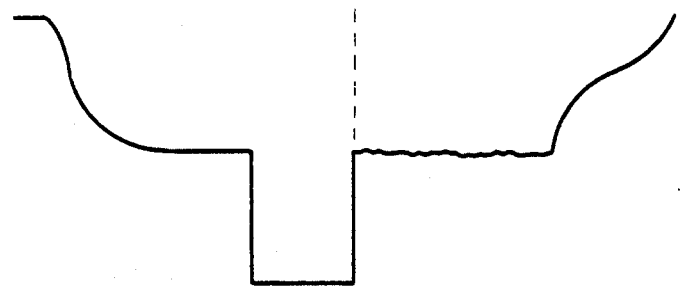
FIG. 7(d)

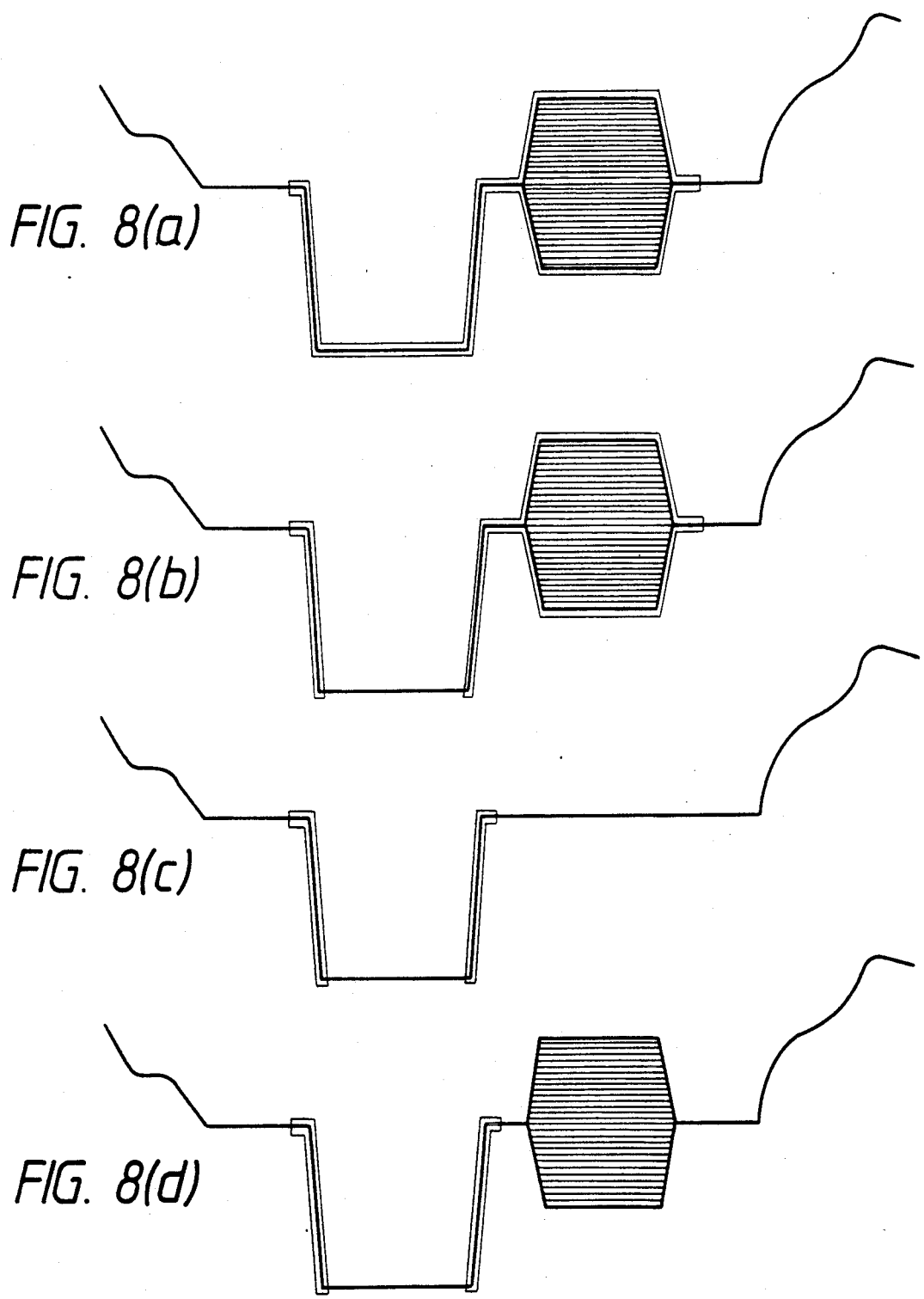

FIG. 16(a)
FIG. 16(b)
FIG. 16(c)
FIG. 16(d)
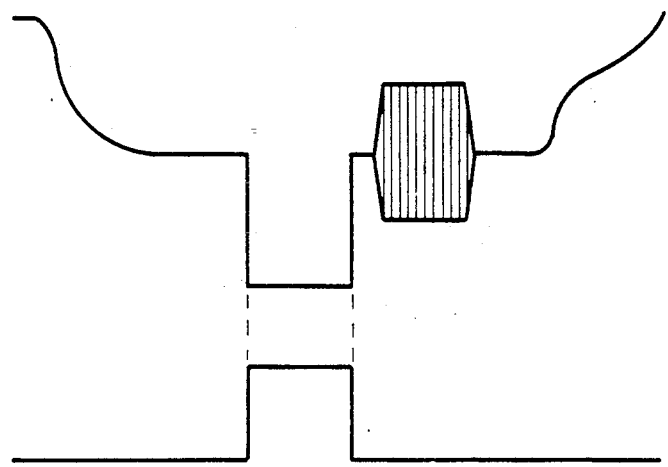
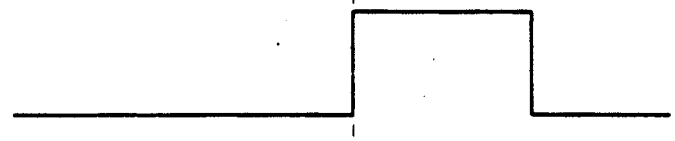
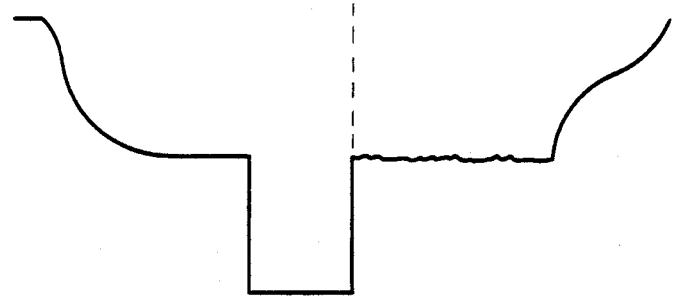

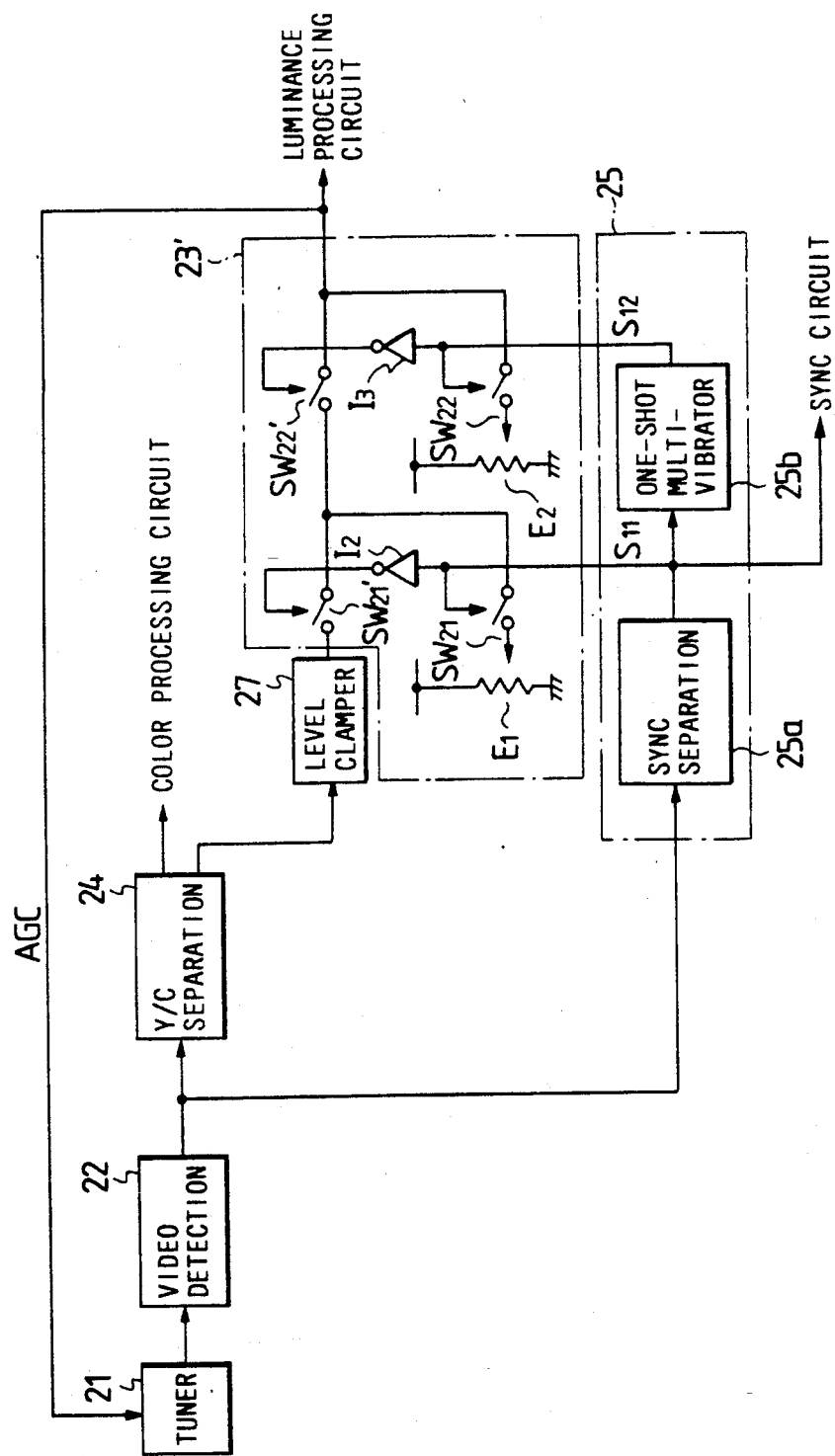

CATV TERMINAL AND VIDEO APPARATUS HAVING A NOISE ELIMINATING CIRCUIT

BACKGROUND OF THE INVENTION

The present invention relates to a CATV terminal used for a CATV system in which a large number of terminals are connected with a center for the transmission of television signals from the center to the terminals. The present invention also relates to video equipment such as a video cassette recorder (VCR), video disk player (VDP) and television receiver.

Generally, a CATV system is constructed to transmit the programs produced in the center and on-air programs to the terminals by way of cables.

In such a CATV system, trunk line amplifiers are incorporated at approximately twenty stages into one trunk line for the transmission of programs to the terminals, and, additionally, line amplifiers are incorporated at two or three stages after the transmission line is branched off from the trunk line. As a result, the terminal equipment at the farthest end of the line receives signals affected by the influence of noise factors (NF) in the amplifiers thus connected to form twenty or more stages on the line.

Moreover, in the CATV system, some of the programs produced in the center are made chargeable, and viewers at the terminals are charged predetermined charges for the reception of those programs.

Therefore, a scrambling operation is performed at the center, which disorganizes television signals so that the chargeable programs cannot be received in a normal condition with an ordinary television reciever, i.e., to prevent the unauthorized reception.

A descrambling means for restoring the scrambled signals to the original signals is incorporated in the CATV terminal of the subscribers who have been permitted to receive the chargeable programs.

Various kinds of systems have hitherto been proposed for such scrambling and descrambling systems. For example, there is a system called the GSS (Gated Sync Suppression) system, in which only the horizontal synchronizing signal portions and the vertical synchronizing signal portions of a video signal are compressed by several decibels to form a scrambled signal so that the horizontal and vertical synchronization cannot be detected by an ordinary television receiver, while the horizontal and vertical synchronizing signal portions of the video signal, so scrambled by their compression by several decibels, can be expanded to the original level at the side of the terminals authorized to receive the chargeable programs. There is another system generally known as the SSS (Sine Sync Suppression) system, in which a video IF signal is AM-modulated (scrambled) with a sine wave in synchronism with the horizontal synchronizing signal, and at the terminal side the transmitted signal is restored to its original signal by AM-demodulating (descrambling) the video IF signal with a sine wave in the reverse phase.

FIGS. 1(a) through 1(e) illustrate the manner in which the scrambling process and the descrambling process are performed by the GSS system mentioned above.

FIG. 1(a) shows an ordinary baseband video signal, and H in the figure represents a horizontal synchronizing signal. FIG. 1(b) shows a state of this video signal as modulated into an intermediate frequency video signal Fv. This intermediate frequency video signal Fv is processed at the transmitting side. i.e., the center, for the compression of the horizontal synchronizing signal portion by, for example, 6 dB or 10 dB, as illustrated in FIG. 1(c).

This compressed portion corresponds to a horizontal blanking interval (HBI) containing the horizontal synchronizing signal H and the color burst signal Cb, and has a period ($t_1$) of, for example, 12 $\mu$sec. And, in the center, a key signal indicating the compression timing is superimposed on an audio FM signal (not illustrated in the figure) and modulated, together with the intermediate frequency video signal Fv, into an RF signal which is transmitted to the terminals.

The terminal equipment, which exists inside the home, extracts the audio FM signal from the received RF signal and then detects the key signal mentioned above in this audio signal. Then, on the basis of the key signal thus detected, the terminal equipment restores the received video signal to their original state by expanding the horizontal synchronizing signal portions and the vertical synchronizing signal portions by approximately 6 dB or 10 dB in correspondence with the compression rate.

The period ($t_2$) in which the terminal equipment expands the video signal is set at a period somewhat narrower than that of the compression; for example, 10 $\mu$sec. This is to ensure the stability of the descrambling circuit and to prevent partial omission of the picture signal portion.

With this setup, the intermediate frequency video signal Fv will be as shown in FIG. 1(d).

The intermediate frequency video signal Fv which has thus been restored in the terminal equipment is processed by AM detection, which converts it into the baseband signal as illustrated in FIG. 1(e). Thereafter, this baseband video signal is subjected to such processes as volume control of the audio signal and superposition onto the video signal, and the resultant signal is modulated again and sent out to the television receiver in the home.

As described above, the terminal equipment in a CATV system receives the video signal affected by the influence of noise factors (NF) of many amplifiers incorporated into the transmission line from the center to the terminal equipment, so that noises are superimposed on the video signal so received and the signal to noise (S/N) ratio of the video signal is thereby deteriorated.

Moreover, at the time of the scrambling operation of the GSS system at the transmitting side, the HBI portion of the intermediate frequency video signal Fv which contains the horizontal synchronizing signal H and the color burst signal Cb is compressed, and, in the descrambling operation of the GSS system at the side of the terminal equipment which receives the compressed signals via the transmission line, the HBI portion of the signal Fv which contains the horizontal synchronizing signal H and the color burst signal Cb is expanded in a manner reverse to the transmitting side. In such an expanding process, the noises in the HBI portion are also expanded, so that the noises on such a portion increase more in comparison with the picture signal portion so that the S/N ratio in the HBI portion is deteriorated by the rate of the expansion, that is, by 6 dB or 10 dB.

Presently, television receivers are in general provided with an AGC circuit for controlling the amplification gain of the receiver in accordance with the voltage for judging the strength of an input radio wave which voltage is generated from the detected composite television signal, lest a change should occur in the contrast of pictures on the screen even if fluctuations occur in the radio wave induced on the antenna by the fading effect, etc. The television receivers as used at present are provided with two kinds of AGC circuits, one being the peak AGC circuit and the other being the keyed AGC circuit.

The peak AGC circuit is a circuit designed to obtain the AGC voltage from the peak value of the synchronizing signal, utilizing the fact that the synchronizing signal level which marks the peak value in the direction of black of the composite television signal maintains a certain constant value provided that intensity of the radio wave in reception remains constant. In practice, a noise eliminating circuit is provided at the preceding stage, lest a change should occur in the gain because of noises mixed into the signal and having an amplitude equal to or in excess of that of the synchronizing signal. For example, the circuit illustrated in FIG. 2 is employed.

On the other hand, the keyed AGC circuit mentioned above is designed to extract and detect only the horizontal synchronizing signal of the composite television signal and to use this detected voltage as the control voltage signal, and, as such, it is not susceptible to the influence of the noises mixed into the composite television signal. The circuit illustrated in FIG. 3, for example, is used.

As it is evident from the illustrated circuits, a capacitor C is used in either type of the AGC circuits to generate the voltage corresponding to the level of the synchronizing signal, and the capacitor C is required to have a capacitance large enough to generate the voltage corresponding to the level of the synchronizing signal even when it is at the maximum level.

Because of this construction, the charging voltage of the capacitor C will change as shown in FIG. 4 under the influence of the large noise which, as described above, is superimposed on the synchronizing signal portion of the video signal in the process of the signal transmission via the cable or in the descrambling process, and the AGC voltage in the AGC circuit will be affected thereby. This change of the AGC voltage for each horizontal scanning line results in the fluctuations of the video signal level, which cause luminance fluctuations in the form of fine streaks running in the horizontal direction on the screen of a television receiver and consequently cause a deterioration of the picture quality.

Moreover, in general, the luminance component of the back porch portion is used as a reference for the luminance of television receiver. Therefore, if large noises are included in the back porch portion in the descrambling process as mentioned above, the reference for luminance fluctuates for each horizontal scanning line, which causes the appearance of dark horizontal lines on the screen of a television receiver, thereby causing a deterioration of the picture quality.

In the foregoing, the description has been made in conjunction with the CATV terminal. From now on, the video equipment is solely dealt with, separately from the CATV terminal. A television signal received with a VCR or VDP is sent out ultimately to a television receiver, and pictures are displayed on the screen of the television receiver. The television receiver itself also reproduces on its screen a signal received with its antenna.

Television receivers are in general provided with an AGC circuit for controlling the amplification gain of the receiver in accordance with the voltage for judging the strength of an input radio wave which voltage is generated from the detected composite television signal, lest a change should occur in the luminance level or contrast of pictures on the screen even if fluctuations occur in the radio wave induced on the antenna by the fading effect, etc. The television receivers as used at present are provided with two kinds of AGC circuits, one being the peak AGC circuit and the other being the keyed AGC circuit.

The peak AGC circuit is a circuit designed to obtain the AGC voltage from the peak value of the synchronizing signal, utilizing the fact that the synchronizing signal level which marks the peak value in the direction of black of the composite television signal maintains a certain constant value provided that intensity of the radio wave in reception remains constant. In practice, a noise eliminating circuit is provided at the preceding stage, lest a change should occur in the gain because of noises mixed into the signal and having an amplitude equal to or in excess of that of the synchronizing signal. For example, the circuit illustrated in FIG. 2 is employed.

On the other hand, the keyed AGC circuit mentioned above is designed to extract and detect only the horizontal synchronizing signal of the composite television signal and to use this detected voltage as the control voltage signal, and, as such, it is not susceptible to the influence of the noises mixed into the composite television signal period. The circuit illustrated in FIG. 3, for example, is used.

Moreover, in general, television receivers employ a circuit commonly known as the pedestal clamping circuit, in which the luminance component of the back porch portion including the color burst signal subsequent to the horizontal synchronizing signal and the portions fore and rear of the color burst signal is used as a reference for the luminance.

As it is evident from the illustrated circuits, a capacitor C is used in either type of the AGC circuits to generate the voltage corresponding to the level of the synchronizing signal, and the capacitor C is required to have a capacitance large enough to generate the voltage corresponding to the level of the synchronizing signal even when it is at the maximum level.

Because of this construction, the charging voltage of the capacitor C will change under the influence of noises as shown in FIG. 4 if the noises are included in the synchronizing signal portion of the video signal produced by demodulating the broadcast wave received with a television receiver, and the AGC voltage in the AGC circuit will be affected thereby. This change in the AGC voltage results in the deterioration of the picture quality because they cause luminance fluctuations in the form of fine streaks running in the horizontal direction on the screen of a television receiver.

Moreover, if large noises are included in the back porch portion, the reference for luminance in the pedestal clamping circuit is fluctuated by the noises, and such fluctuations result in the appearance of dark lateral horizontal lines on the screen of a television receiver, thereby causing a deterioration of the picture quality.

SUMMARY OF THE INVENTION

Therefore, in view of the problems described above, an object of this invention is to offer a CATV terminal which can eliminate the noises superimposed on a synchronizing signal, lest the picture quality should be deteriorated in consequence of luminance changes in the form of fine streaks in the horizontal direction on a screen because of fluctuations of an AGC voltage in an AGC circuit in a television receiver under the influence of the noises superimposed on the synchronizing signal in the process of transmission of a video signal or in a descrambling process.

Another object of this invention is to offer a CATV terminal which can eliminate the noises present in a back porch portion, lest the picture quality should be deteriorated by dark horizontal streaks appearing on a screen by fluctuations of a reference for luminance of a television receiver which are caused by the noises superimposed on the back porch portion in the process of transmission of a video signal or in a descrambling process.

Another object is to offer a video apparatus which can eliminate the noises superimposed on a synchronizing signal, lest the picture quality should be deteriorated in consequence of luminance changes in the form of fine streaks in the horizontal direction on a screen because of fluctuations of an AGC voltage in an AGC circuit in a television receiver under the influence of the noises superimposed on the synchronizing signal of the video signal.

A further object of this invention is to offer a video apparatus which can eliminate the noises present in a back porch portion, lest the picture quality should be deteriorated by of dark horizontal streaks appearing on a screen by fluctuations of a reference for luminance of a television receiver which are caused by the noises superimposed on the back porch portion.

The above described objects can be attained by a CATV terminal apparatus which detects a radio frequency video signal sent through a transmission line, converts the detected signal into a baseband video signal, and modulates the baseband video signal into an output radio frequency signal, or which receives a scrambled video signal and descrambles the received video signal; wherein, according to the present invention, the apparatus comprises first noise eliminating means for eliminating a noise superimposed on a DC part of a horizontal synchronizing signal of the video signal by integrating the DC part, and/or separating means for separating the video signal into a color signal and a luminance signal, and second noise eliminating means for eliminating a noise superimposed on a back porch of the luminance signal by integrating the back porch.

Alternatively, according to the invention, a CATV terminal apparatus comprises first noise eliminating means for eliminating a noise superimposed on a DC part of a synchronizing signal of the video signal by replacing the DC part with a first predetermined constant voltage, and/or separating means for separating the video signal into a color signal and a luminance signal, and second noise eliminating means for eliminating a noise superimposed on a back porch of the luminance signal by replacing the back porch with a second predetermined constant voltage.

The CATV terminal apparatus with the construction described above overcomes the problem that the AGC in the television receiver is disturbed by the noises introduced in the DC part of the horizontal synchronizing signal in the process of transmission of the signal or in the descrambling process, because the noise eliminating means in the terminal apparatus integrates the DC part of the horizontal synchronizing signal of the video signal and thereby eliminates such noises from the DC part.

Moreover, the terminal according to this invention overcomes the problem that the reference for the luminance is disturbed by the noises introduced in the back porch in the process of signal transmission or in the descrambling process, because the noise eliminating means provided in the terminal apparatus integrates the back porch of the video signal and thereby eliminates such noises superimposed on the back porch.

Furthermore, the terminal apparatus according to the present invention overcomes the problem that the AGC is disturbed by the noises in the DC part of the horizontal synchronizing signals introduced in the process of signal transmission or in the descrambling process, because the noise eliminating means in the terminal apparatus replaces the DC part of the horizontal synchronizing signal of the video signal with the prescribed constant voltage and thereby eliminates such noises superimposed on the DC part.

Still furthermore, the terminal apparatus according to the present invention overcomes the problem that the reference for the luminance is disturbed by the noises introduced in the back porch in the process of signal transmission or in the descrambling process, because the noise eliminating means in the terminal apparatus replaces the back porch of the video signal with the prescribed constant voltage and thereby eliminates such noises superimposed on the back porch.

In order to solve the problems described hereinabove, a video apparatus in accordance with the present invention comprises first noise eliminating means for eliminating a noise superimposed on a DC part of a horizontal synchronizing signal of a video signal by integrating the DC part, and/or separating means for separating the video signal into a color signal and a luminance signal, and second noise eliminating means for eliminating a noise superimposed on a back porch of the luminance signal by integrating the back porch.

Alternatively, according to the invention, a video apparatus comprises first noise eliminating means for eliminating a noise superimposed on a DC part of a synchronizing signal of a video signal by replacing the DC part with a first constant voltage, and/or separating means for separating a video signal into a color signal and a luminance signal, and second noise eliminating means for eliminating a noise superimposed on a back porch of the luminance signal by replacing the back porch with a second predetermined constant voltage.

The video apparatus with the construction described above overcomes the problem that the AGC in the television receiver is disturbed by the noises introduced in the DC part of the horizontal synchronizing signal, because the noise eliminating means in the video apparatus integrates the DC part of the horizontal synchronizing signal of the video signal and thereby eliminates such noises overlapping with the DC part.

Moreover, the video apparatus according to the present invention overcomes the problem that the reference for the luminance of the television receiver is disturbed by the noises introduced in the back porch of the video signal, because the noise eliminating means in the said video apparatus integrates the back porch of the video signal and thereby eliminates such noises superimposed on the back porch.

Furthermore, the video apparatus according to the present invention overcomes the problem that the AGC in the television receiver is disturbed by the noises in the DC part of the horizontal synchronizing signal, because the noise eliminating means in the video apparatus replaces the DC part of the horizontal synchronizing signal in the video signal with the prescribed constant voltage and thereby eliminates such noises superimposed on the DC part.

Still further, the video apparatus according to this invention overcomes the problem that the reference for the luminance of the television receiver is disturbed by the noises introduced in the back porch of the video signal, because the noise eliminating means provided in the video apparatus replaces the back porch of the video signal with the prescribed constant voltage and thereby eliminates such noises superimposed on the back porch.

BRIEF DESCRIPTION OF THE DRAWINGS

FIGS. 7(a) through 7(d) and FIGS. 8(a) through 8(d) are waveform charts for explaining operations of a noise eliminating process circuit presented in FIG. 5;

FIGS. 16(a) through 16(d) and FIGS. 17(a) through 17(d) are waveform charts for explaining operations of a noise eliminating process circuit shown in FIG. 15;

FIG. 22 is a block diagram illustrating another embodiment of video equipment;

DETAILED DESCRIPTION OF THE PREFERRED EMBODIMENTS

Preferred embodiments of the present invention are described with reference to the accompanying drawings.

Figure 1A:
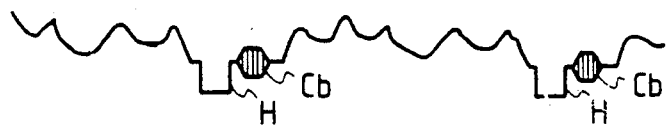
FIGS. 1(a)-1(e) is a waveform chart illustrating a scrambling operation and a descrambling operation.
Figure 1B:
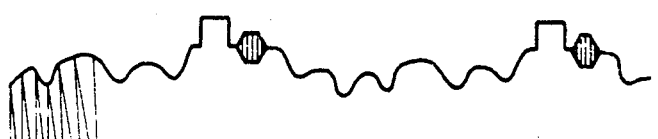
Figure 1C:
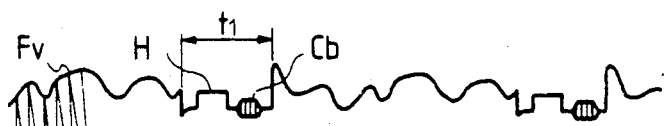
Figure 1D:
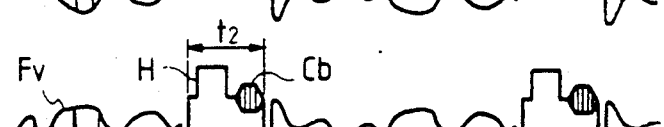
Figure 1E:
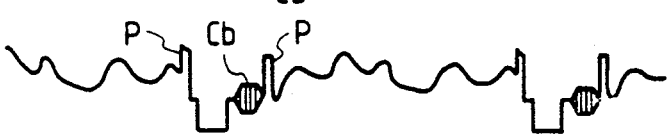
Figure 2:
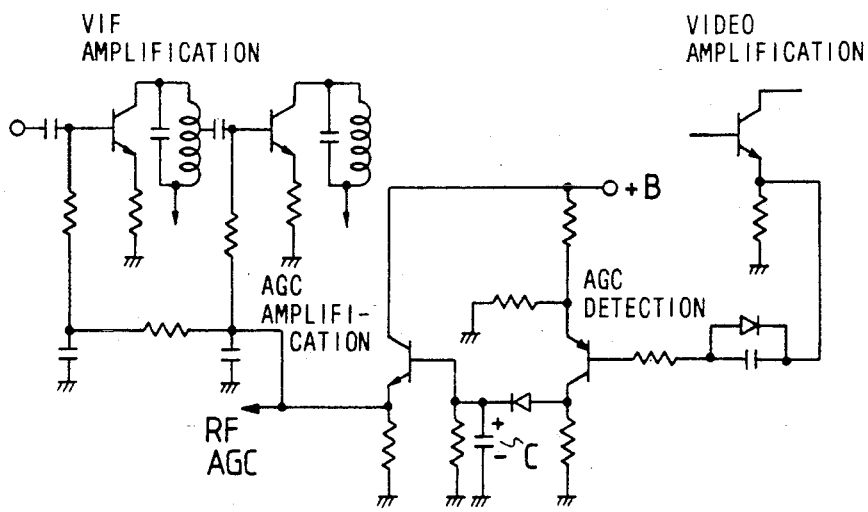
FIG. 2 and FIG. 3 are circuit diagrams respectively showing examples of AGC circuits.
Figure 3:
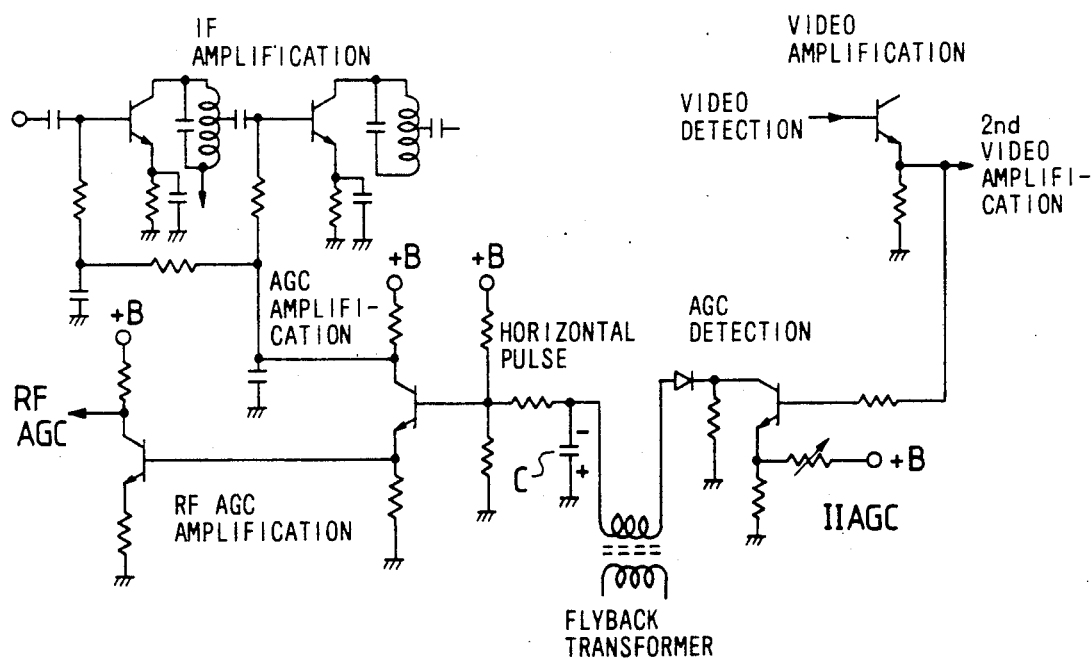
Figure 4:
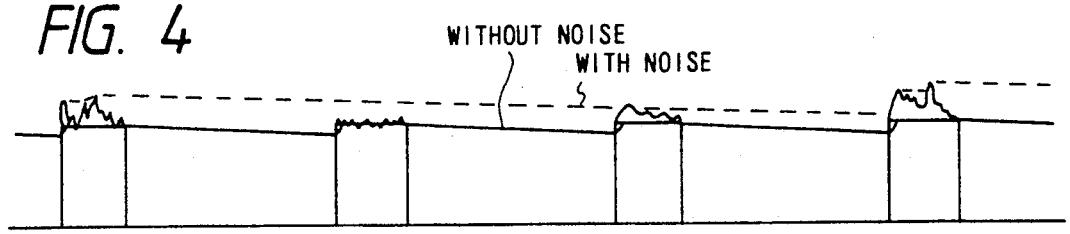
FIG. 4 is a chart showing charging characteristics of a capacitor in the AGC circuit.
Figure 5:
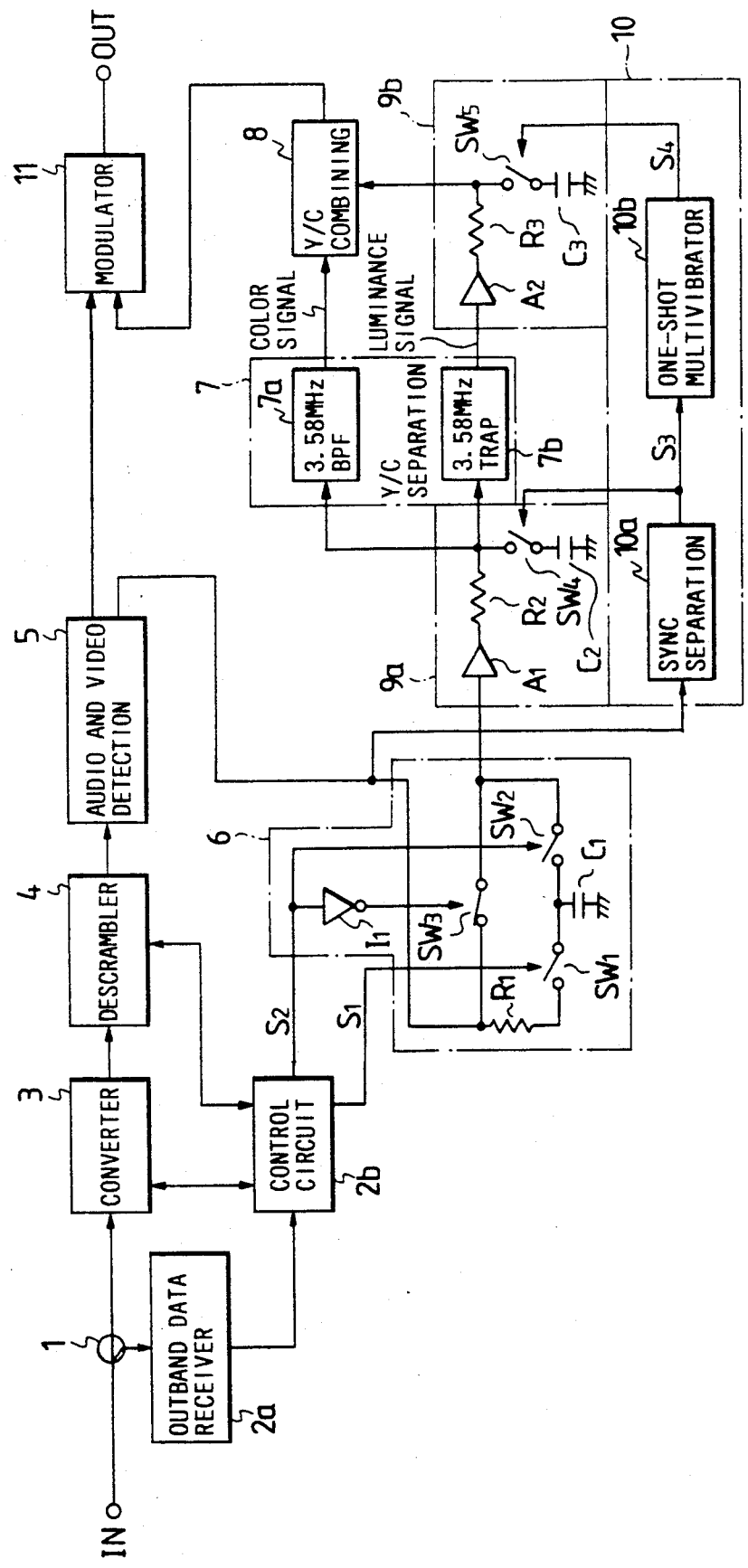
FIG. 5 is a block diagram showing an embodiment of CATV terminal equipment according to the present invention.

FIG. 5 illustrates one embodiment of CATV terminal equipment according to the present invention. In this figure, an RF signal transmitted via a coaxial cable from a CATV center is applied to a branching device 1 through an input terminal IN, and the signal is divided by this branching device 1. One part of the signal as divided by this branching device 1 is fed via an outband data receiver 2a to a control circuit 2b composed of a CPU which operates in accordance with a predetermined program, while the other part of the RF signal branched off by the branching device 1 is fed into a converter 3.

The outband data receiver 2a mentioned above detects the data that specifies a channel capable of signal reception in the converter 3 in the terminal equipment and the data indicating whether or not the terminal can receive an event program. Moreover, the converter 3 selects a particular channel under the control of the control circuit 2b and outputs a signal of the selected channel, frequency converts the signal to produce an intermediate frequency signal on its output terminal, and also detects a key signal included in an audio intermediate frequency signal of the low frequency range and sends out this signal to the control circuit 2b. This key signal contains information on the timing at which the horizontal synchronizing signal portion H of the video signal is compressed at the center, which is, in other words, the information on the timing at which the horizontal synchronizing signal portion H is to be expanded in the terminal equipment. Also, when the GSS system detects a vertical synchronizing signal, the terminal equipment detects the timing at which the key signal in the horizontal synchronizing signal becomes absent and, using the detected key signal as a trigger, generates a timing of the vertical synchronizing signal to produce the vertical synchronizing signal. The intermediate frequency signal which is obtained at the output of the converter 3 is input to a descrambler 4, in which the intermediate frequency video signal Fv of the high frequency range is descrambled.

Moreover, the control circuit 2b decodes the expansion data for the horizontal synchronizing signal portion of the video signal on the basis of the outband data acquired by the outband data receiver 2a and the key signal mentioned above. Then, the expansion data is sent out from the control circuit 2b to the descrambler 4, and on the basis of this data the descrambler 4 descrambles the video signal Fv, which has been scrambled, at the expansion timing corresponding to the key signal. The intermediate frequency video signal as descrambled with the descrambler 4 and the intermediate frequency audio signal from which the key signal has been eliminated are detected by an audio and video detecting circuit 11. The audio signal so detected is sent out directly to a modulator 5 and the video signal so detected is sent out to a white level pulse eliminating circuit 6.

The white level pulse eliminating circuit 6 eliminates white level pulses (rabbit ear noise), which are the fore and rear portions left over in the restoration process of the video signal due to the difference between the compressing period ($t_1$) at the time of scrambling and the expanding period ($t_2$) at the time of descrambling by the GSS system, by replacing the white level pulses with the signal at the pedestal level or at a level in the neighborhood of the pedestal level of the received video signal. The white level pulse eliminating circuit 6 is controlled with the control signal, which is described later, from the control circuit 2b. In the case of the SSS system, the signal passes through the white level pulse eliminating circuit 6 without receiving any substantial operation.

The video signal from which the white level pulses have been eliminated with the white level eliminating circuit 6 is sent out to a first noise eliminating circuit 9a, in which the noises superimposed on the horizontal synchronizing signal are eliminated. The noise-eliminated video signal is sent out to a Y/C separating circuit 7 which is composed of a 3.58 MHz BPF 7a and a 3.58 MHz trap 7b, and a color signal and a luminance signal is separated from each other in this circuit. The color signal as separated by the Y/C separating circuit 7 is sent out directly to a Y/C combining circuit 8, and the luminance signal is sent out to a second noise eliminating circuit 9b, where the noises superimposed on the back porch portion consisting of the color burst signal and the portions fore and rear of the color burst signal are eliminated. That is to say, the noise eliminating circuits 9a and 9b together form a noise eliminating process circuit which serves to eliminate the noises superimposed on the synchronizing signal and the back porch which have been expanded in the descrambling process. This noise eliminating process circuit is controlled with the timing control signals, which are described later, from a timing generating circuit 10. The video signal from which the noises have been eliminated by the noise eliminating process circuit are put into the Y/C combining circuit 8, in which the luminance signal is combined with the color signal, and the resultant combined signal is sent out to a modulator 11. The combined signal is modulated into a prescribed frequency by the modulator 11 and is then sent out from an output terminal OUT to equipment not illustrated herein, e.g., to a television receiver.

FIG. 6 illustrates the timing relations in the operations of the descrambler 4 and the white level pulse eliminating circuit 6. For convenience in description, the video signals are expressed in the baseband.

Figure 6A:
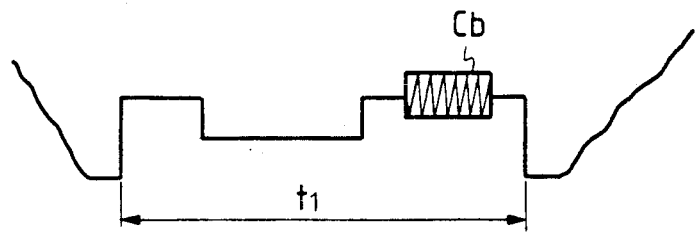
FIGS. 6(a) through 6(f) are a waveform charts for explaining operations of a white level pulse eliminating circuit shown in FIG. 5.
Figure 6B:
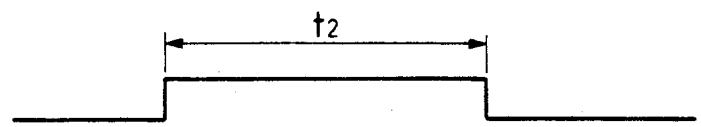
Figure 6C:
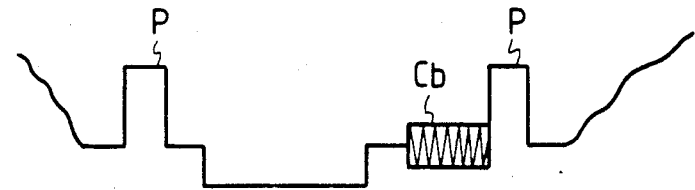
Figure 6D:
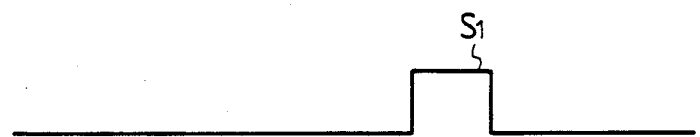
Figure 6E:

More specifically, FIG. 6(a) shows a video signal as transmitted from the center. This video signal has been processed for the compression of the horizontal blanking portion including the horizontal synchronizing signal poriton H and the color burst signal portion Cb at a prescribed rate in a period ($t_1$) of, e.g., 12 μsec. FIG. 6(b) shows a timing signal for the expansion of the video signal in the descrambling process. This timing signal is produced on the basis of the key signal obtained by the key signal detection, and a period of the timing signal ($t_2$) is, for example, 10 μsec as mentioned above. On the video signal shown in FIG. 6(a). the expansion timing signal shown in FIG. 6(b) works to produce a descrambled signal shown in FIG. 6(c). This descrambled base band video signal is obtained in the output of the audio and video detecting circuit 5.

The key signal obtained by the key signal detection with the converter 3 is sent to the control circuit 2b, in which the timing control signals $S_1$ and $S_2$ respectively covering the color burst signal Cb and the white level pulse P on each outer side of the expansion timing signal are obtained.

Figure 6F:
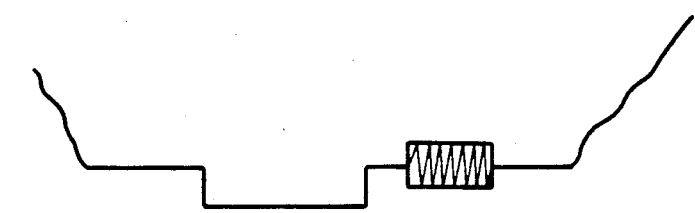

The white level pulse eliminating circuit 6 is controlled for its switching with the timing control signals $S_1$ and $S_2$ mentioned above. This white level pulse eliminating circuit 6 has a video switch $SW_1$ which is turned on when the control signal $S_1$ is at a high level, video switches $SW_2$ and $SW_3$ which are complementarily turned on with the control signal $S_2$ and the control signal $S_2$ as inverted by the inverter $I_1$, respectively, and an integration circuit consisting of a resistor $R_1$ and a capacitor $C_1$. The color burst signal is integrated by turning on the switch $SW_1$ in accordance with the control signal $S_1$, and the integration level is output through the switch $SW_2$ being turned on in accordance with the control signal $S_2$. With this process, the white level pulses are eliminated and, instead, these portions are kept at the integration level of the color burst signal Cb. As a result of this process, the video signal produced in the output of the white level pulse eliminating circuit 6 will be the signal as shown in FIG. 6(f), which has been obtained by eliminating the pulse P left over in the descrambling process.

FIG. 7 and FIG. 8 illustrate the timing relations in the operations of the noise eliminating process circuit which is composed of the first noise eliminating circuit 9a and the second noise eliminating circuit 9b shown in FIG. 5, and in the Y/C separating circuit 7. For convenience in description, the signals are expressed in the baseband.

More specifically, FIG. 7(a) shows the video signal from which the white level pulses have been eliminated in the white level pulse eliminating circuit 6. This video signal includes noises larger than those in the other portions, as illustrated in FIG. 8(a), as a result of having been subjected to the expanding operation with the descrambler 4 mentioned above, and is sent out to the first noise eliminating circuit 9a. The timing generating circuit 10 has a synchronization separating circuit 10a which outputs a timing control signal $S_3$ shown in FIG. 7(b) by separating the synchronizing signal from the video signal, and a one-shot multivibrator circuit 10b which outputs a timing control signal $S_4$ illustrated in FIG. 7(c) in response to the trailing edge of the timing control signal $S_3$ output from the synchronization separating circuit 10a. The timing control signals $S_3$ and $S_4$ are output respectively to the first noise eliminating circuit 9a and the second noise eliminating circuit 9b.

The first noise eliminating circuit 9a is comprised of an amplifier $A_1$ and an integration circuit composed of a resistor $R_2$ and a capacitor $C_2$, and a switch $SW_4$ which effect the integration circuit by being turned on in response to the timing control signal $S_3$ mentioned above. At the output of this first noise eliminating circuit 9a, there is obtained such a video signal that the noises have been eliminated from the DC part of the synchronizing signal, as shown in FIG. 8(b). The video signal which is obtained at the output of this first noise eliminating circuit 9a is divided into the color signal and the luminance signal shown in FIG. 7(d) by the Y/C separating circuit 7, and the luminance signal is sent out to the second noise eliminating circuit 9b.

The second noise eliminating circuit 9b is composed of an amplifier $A_2$, an integration circuit comprised of a resistor $R_3$ and a capacitor $C_3$, and a switch $SW_5$ which effects the integration circuit by being turned on in response to the timing control signal $S_4$ mentioned above. At the output of this second noise eliminating circuit 9b, there is obtained such a luminance signal that the noises have been eliminated from the color burst signal and the portions fore and rear of the color burst signal, as shown in FIG. 8(c). This signal is sent out to the Y/C combining circuit 8 and combined with the color signal in this circuit. As a result of the processes mentioned above, a video signal as shown in FIG. 8(d) is produced by eliminating the noises from the portions which have been subjected to the descrambling operation, i.e., the synchronizing signal portion and the back porch portion including the color burst signal, and appears at the output of the Y/C combining circuit 8.

Figure 9:
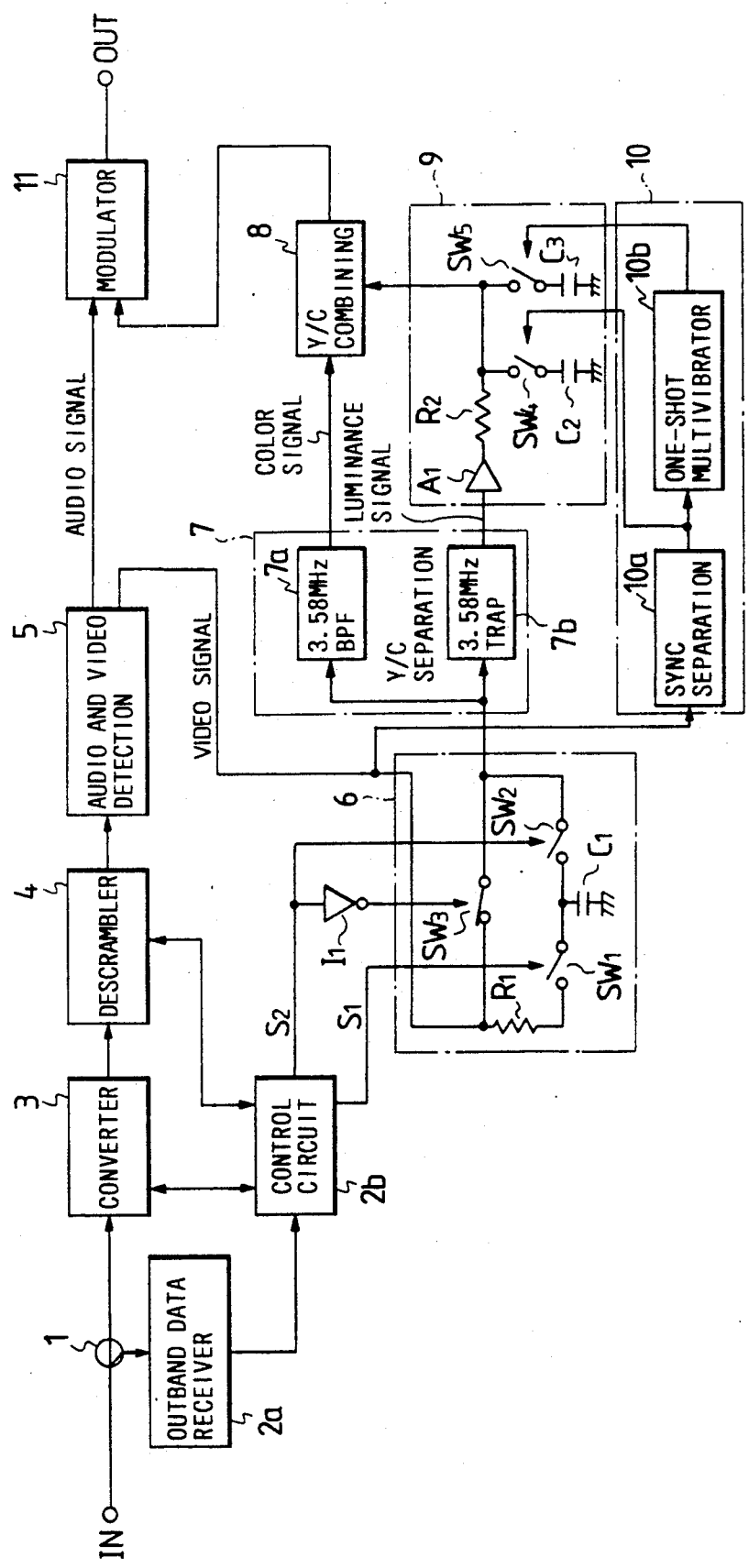
FIG. 9 is a block diagram showing a second embodiment of the CATV terminal equipment according to the present invention.

FIG. 9 illustrates a second embodiment of the present invention, and the same parts as those in FIG. 5 are represented by the same reference numbers. In this embodiment, the system is designed to perform the elimination of the noises superimposed on the synchronizing signal and the back porch on the luminance signal separated by the Y/C separating circuit 7. A noise eliminating process circuit 9, which uses an amplifier $A_1$ and a resistor $R_2$ in common and has capacitors $C_2$ and $C_3$ and switches $SW_4$ and $SW_5$, is provided between the Y/C separating circuit 7 and the Y/C combining circuit 8.

Figure 10:
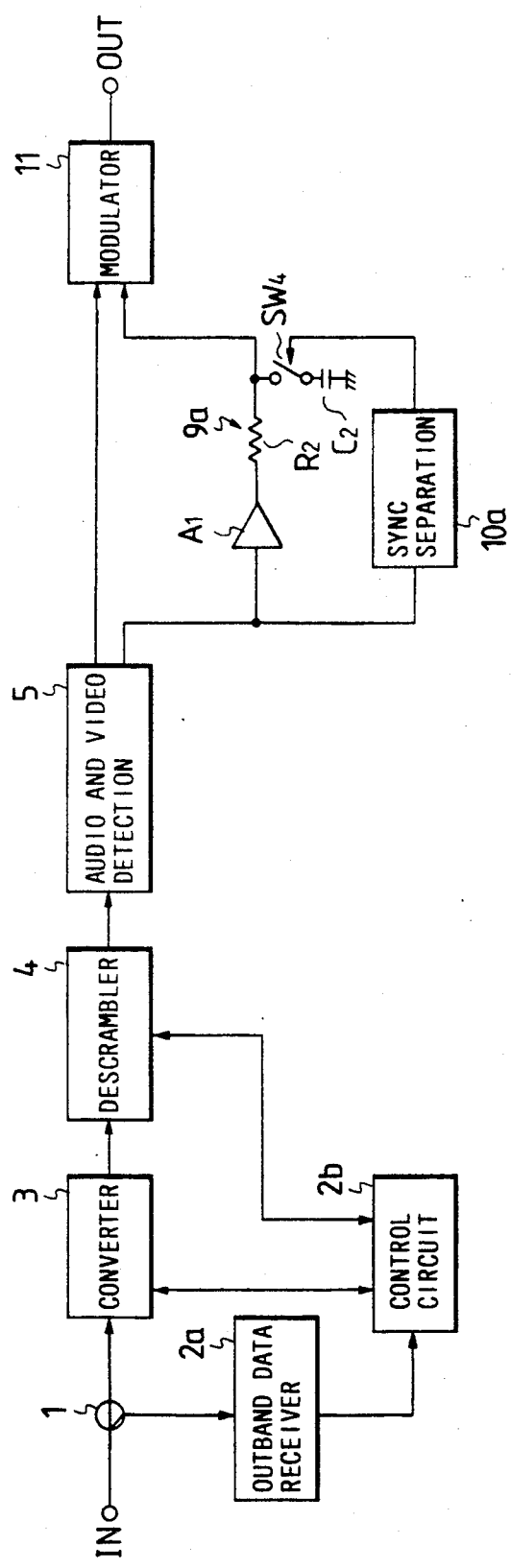
FIG. 10 is a block diagram illustrating a third embodiment of the CATV terminal equipment according to the present invention.

FIG. 10 illustrates a third embodiment of the present invention, and the same parts as those in FIG. 5 are indicated by the same reference numbers. This embodiment has a simplified construction suitable for a television receiver which has a short time constant of AGC but has a sufficient pedestal clamping capability. This system is designed to eliminate only the noises superimposed on the synchronizing signal by the circuit comprising the first noise eliminating circuit 9a and the synchronization separating circuit 10a illustrated in FIG. 5.

In the first through third embodiments described above, the noises are eliminated by an integration circuit comprised of a resistor and a capacitor, but it is feasible to replace the horizontal synchronizing signal portion and the pedestal portion (back porch portion) with a prescribed DC potential.

Figure 11:
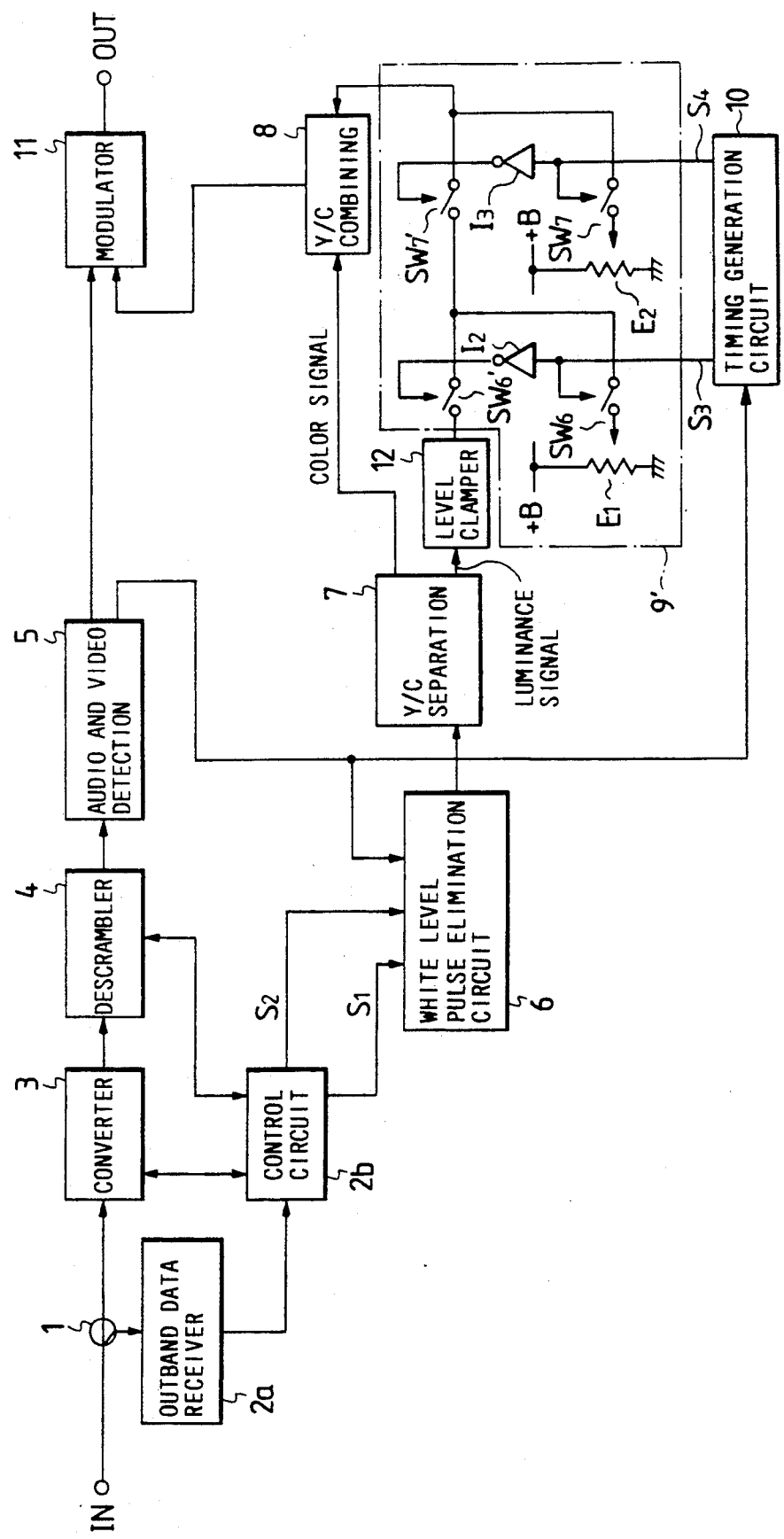
FIG. 11 is a block diagram illustrating another embodiment of the CATV terminal terminal equipment according to the present invention.

FIG. 11 illustrates another embodiment which is designed to replace the horizontal synchronizing signal portion and the pedestal portion (back porch portion) with a prescribed DC potential, and the same parts as those in FIG. 5 are indicated with the same reference numbers. In this embodiment, a luminance signal separated by a Y/C separating circuit 7 is sent out to a level clamping circuit 12 which clamps the pedestal level. This pedestal clamping circuit 12 is the circuit for maintaining the DC level of the video signal at a certain constant potential on the basis of the horizontal sync DC level of the baseband signal. The luminance signal whose DC level is maintained at a constant potential by the pedestal clamping circuit 12 is sent out to a noise eliminating process circuit 9'.

The noise eliminating process circuit 9' is provided with switches $SW_6$ and $SW_6'$, which are complementarily turned on by the effect of an inverter $I_2$ in response to a timing control signal $S_3$, switches $SW_7$ and $SW_7'$ which are complementarily turned on by the effect of an inverter $I_3$ in response to a timing control signal $S_4$, a first voltage generator $E_1$ which generates a voltage corresponding to the level of the horizontal synchronizing signal that is lower by a certain constant voltage value than the pedestal level, and a second voltage generator $E_2$ which generates a voltage corresponding to the level of the pedestal level. This noise eliminating process circuit 9' replaces the DC part of the horizontal synchronizing signal and the pedestal portion (back porch portion) with respective prescribed voltages by controlling the on and off operations of the switches $SW_6$ through $SW_7'$ with the timing control signals $S_3$ and $S_4$, thereby eliminating the noises superimposed on those portions.

Figure 12:
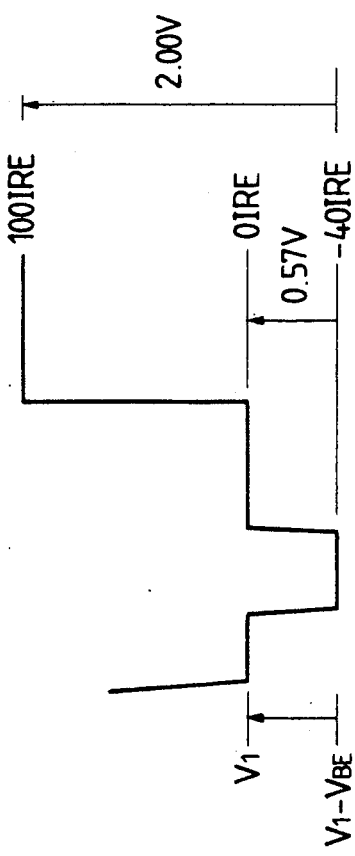
FIG. 12 is a waveform chart showing the relationship between a pedestal level and a DC part of a horizontal synchronizing signal in a video signal.

In this regard, as shown in FIG. 12, the video signal is set in such a way that the pedestal level will be 0 IRE (the unit of the video signal level), that the maximum level of the video signal will be 100 IRE, and that the DC part of the horizontal synchronizing signal will be $-40$ IRE. Therefore, the DC part of the horizontal synchronizing signal will be at the potential level lower by 0.57 V than the pedestal level when the peak-to-peak amplitude of the video signal is set at 2 $V_{p-p}$, as shown in FIG. 12. This value (0.57 V) is a value approximately equal to the base-emitter voltage $V_{BE}$ of transistors.

Figure 13:
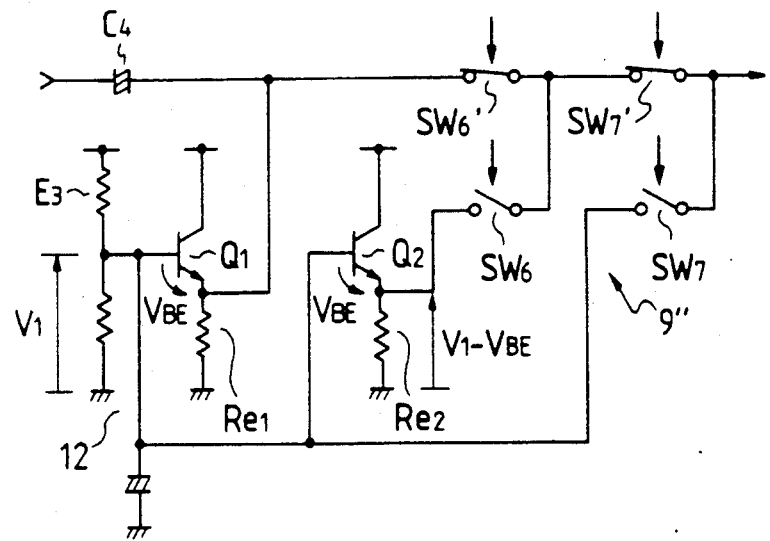
FIG. 13 is a circuit diagram showing a modification including changes in some parts of the diagram shown in FIG. 7.

Therefore, the level clamping circuit 12 and the noise eliminating process circuit 9' mentioned above can be combined into a circuit construction shown in FIG. 13. In FIG. 13, a level clamping circuit 12 is comprised of a voltage generator $E_3$, a transistor $Q_1$ to the base of which a voltage $V_1$ generated by this voltage generator $E_3$ is applied, and an emitter resistor $R_{e1}$. The level clamping operation is performed by constantly feeding the emitter voltage $(V_1 - V_{BE})$ from the transistor $Q_1$ to the video signal line to which the luminance signal is input via a coupling capacitor $C_4$. A noise eliminating process circuit 9'' has a transistor $Q_2$, to the base of which the voltage $V_1$ generated by the voltage generator $E_3$ in the level clamping circuit 12 is applied, and an emitter resistor $R_{e2}$. With the construction described above, the emitter voltage $(V_1 - V_{BE})$ of the transistor $Q_2$ is substituted for the synchronizing signal by turning off the switch $SW_6'$ and turning on the switch $SW_6$ with the timing control signal $S_3$ kept at a high level during the synchronizing signal period and the voltage $V_1$ generated by the voltage generator $E_3$ is substituted for the back porch portion by turning off the switch $SW_7'$ and turning on the switch $SW_7$ with the timing control signal $S_4$ kept at a high level during the back porch period.

It is noted that the video signal of 2 $V_{p-p}$ is converted into a video signal of 1 $V_{p-p}$ by terminating it with a resistor of 75 Ohms at its input side.

Figure 14:
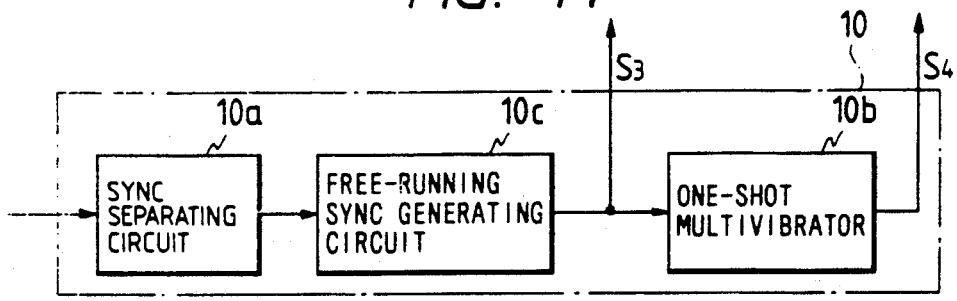
FIG. 14 is a chart showing a modification of a timing generating circuit in the embodiments illustrated in FIG. 5, etc.

The timing generating circuit 10 in the embodiments explained above is composed of a synchronization separating circuit 10a and a one-shot multivibrator circuit 10b. This can be changed to a construction illustrated in FIG. 14. In FIG. 14, a free-running synchronization generating circuit 10c is inserted between the synchronization separating circuit 10a and the one-shot multivibrator circuit 10b. This free-running synchronization generating circuit 10c makes it possible to eliminate the jitters due to the noises included in the horizontal synchronizing signal since this circuit generates on a free-running basis the horizontal synchronizing signals during one vertical synchronizing period by counting the horizontal synchronizing signals in the vertical synchronizing signal which has been separated by the synchronization separating circuit 10a.

In the above embodiments, the horizontal synchronizing signal portion and the back porch portion are integrated or replaced by the appropriate voltages using the voltage generators, the invention is not limited to those embodiments. For example, the horizontal synchronizing signal portion and the back porch portion may be replaced by appropriate voltages produced by a sampling hold method. This method offers the advantage that the replacing voltage level produced by the sampling hold method is more stable than the level produced by the integration.

As described in the foregoing, the terminal equipment according to the present invention is capable of eliminating the noises superimposed on the synchronizing signal in the process of signal transmission or in the descrambling process, thereby offering the advantage that the AGC voltage in the AGC circuit of the television receiver will not be liable to fluctuations due to such noises and that the picture quality on the screen will not be deteriorated in consequence of the luminance fluctuations in the form of fine streaks running in the horizontal direction on the screen.

In addition, the terminal equipment according to the present invention is capable of eliminating the noises superimposed on the back porch portion in the process of signal transmission or in the descrambling process, offering the advantage that the reference for the luminance of the television receiver will not be affected with fluctuations due to such noises and that the picture quality will not be deteriorated in consequence of the appearance of dark streaks in the horizontal direction on the screen.

In the following, the preferred embodiments of a second aspect of the present invention are described with reference to the accompanying drawings. The second aspect deals with video equipment such as a television receiver solely, i.e., separately from the CATV system.

Figure 15:
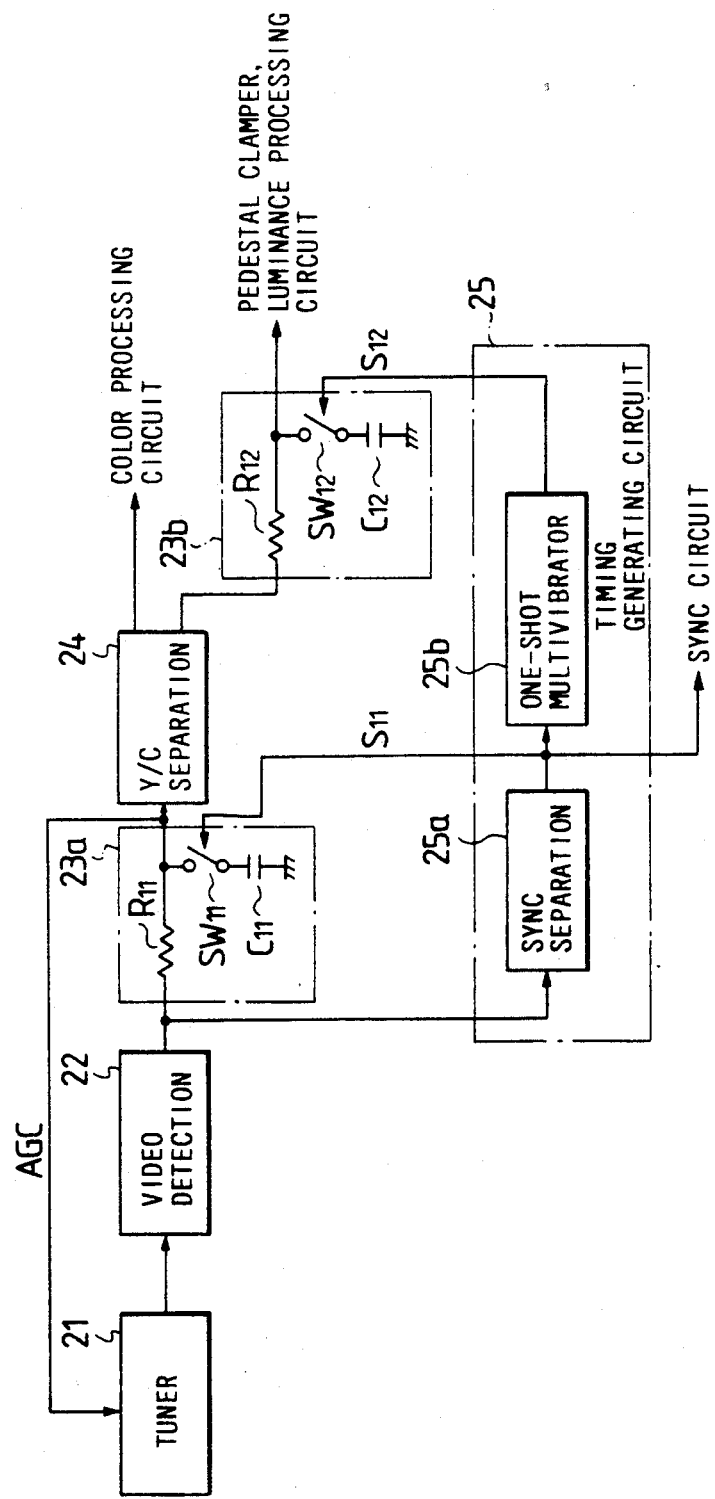
FIG. 15 is a block diagram showing an embodiment of video equipment according to the present invention.

FIG. 15 illustrates principal parts of a television receiver which is one embodiment of video equipment according to the present invention. In this figure, television broadcasting waves received with an antenna not illustrated in the figure are input to a tuner 21, which selects a particular channel under the control of a control circuit not illustrated in the figure, frequency-converts the signal of the selected channel, and outputs the converted signal as an intermediate frequency signal at its output terminal.

The intermediate frequency signal obtained at the output from the tuner 21 is divided into a video intermediate frequency signal in the higher frequency range and an audio intermediate frequency signal in the lower frequency range, and the video intermediate frequency signal is put into the video detecting circuit 22. The video signal detected by the video detecting circuit 22 is sent to a first noise eliminating circuit 23a, in which the noises superimposed on the horizontal synchronizing signal portion are eliminated.

Such a video signal in which the noises in the horizontal synchronizing signal portion have been eliminated is sent to a Y/C separating circuit 24 composed of a 3.58 MHz BPF and a 3.58 MHz trap, in which the video signal is separated into a color signal and a luminance signal. The color signal as separated by the Y/C separating circuit 24 is sent to a color processing circuit not illustrated in the figure, and the luminance signal is sent to a second noise eliminating circuit 23b, where the noises superimposed on the color burst signal and the portions fore and rear of the color burst signal portion are eliminated.

That is, the noise eliminating circuits 23a and 23b mentioned above together form a noise eliminating process circuit which serves to eliminate the noises superimposed on the synchronizing signal and the back porch and is controlled with timing control signals, which are described later, from a timing generating circuit 25. The video signal from which the noises have been eliminated by the noise eliminating process circuit is sent to a pedestal clamping circuit and a luminance processing circuit, which are not shown in the figure.

The timing generating circuit 25 mentioned above is composed of a synchronization separating circuit 25a which separates the synchronizing signal H from the video signal shown in FIG. 16(a), and a one-shot multivibrator circuit 25b which generates a pulse signal continuing for a prescribed duration of time in response to the trailing edge of the synchronizing signal H separated by this synchronization separating circuit 25a. The synchronizing signal H which has been thus separated by the synchronization separating circuit 25a is sent to the synchronizing circuit not illustrated in the figure and is also sent as a timing control signal $S_{11}$ to the first noise eliminating circuit 23a, while the pulse signal generated by the on-shot multivibrator circuit 25b is sent as a timing control signal $S_{12}$ to the second noise eliminating circuit 23b.

Figure 17A:
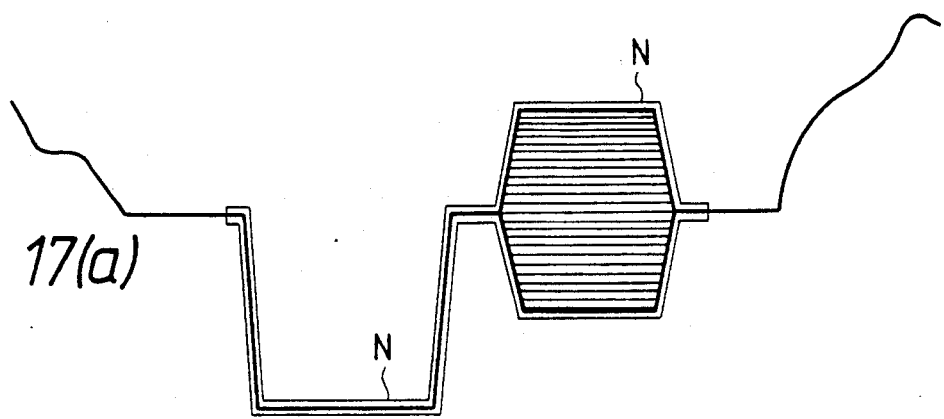
Figure 17B:
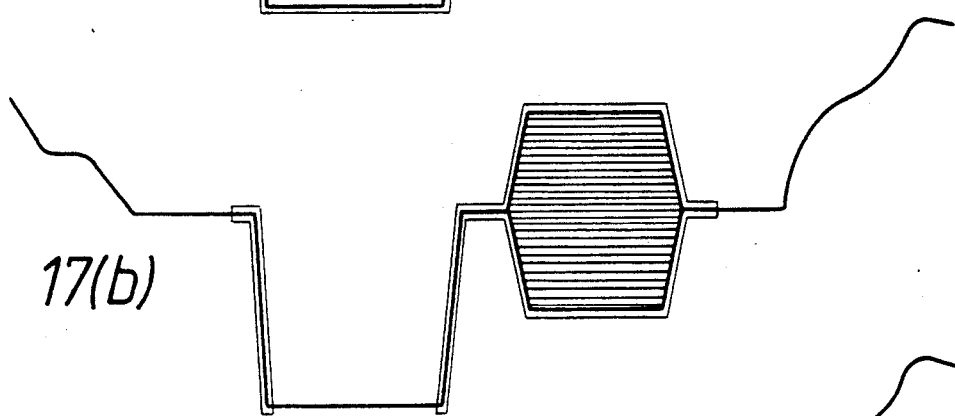

The first noise eliminating circuit 23a is comprised of an integration circuit composed of a resistor $R_{11}$ and a capacitor $C_{11}$, and a switch $SW_{11}$ which effects the integration circuit by being turned on in response to the timing control signal $S_{11}$ mentioned above. To this first noise eliminating circuit 23a is input a video signal on which noises N are superimposed as illustrated in FIG. 17(a). And, such a video signal that the noises from the DC part of the synchronizing signal have been eliminated is obtained at the output of this first noise eliminating circuit 23a, as shown in FIG. 17(b). The video signal obtained at the output of this first noise eliminating circuit 23a is separated into the color signal and the luminance signal shown in FIG. 17(c) by the Y/C separating circuit 24, and the luminance signal is sent to the second noise eliminating circuit 23b.

Figure 17C:
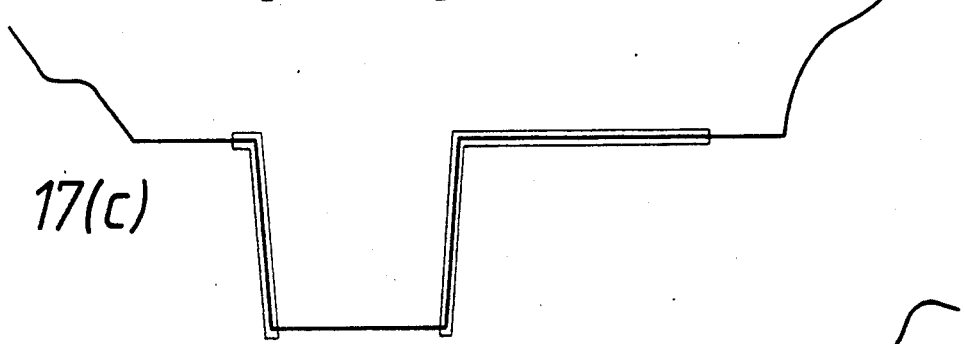
Figure 17D:
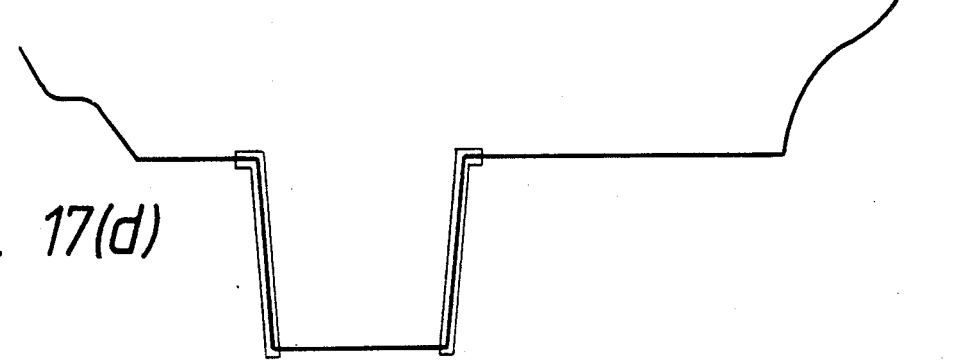

The second noise eliminating circuit 23b has an integration circuit comprised of a resistor $R_{12}$ and a capacitor $C_{12}$, and a switch $SW_{12}$ which effects the integration circuit by being turned on in response to the timing control signal $S_{12}$ mentioned above. The video signal shown in FIG. 17(c) is input to this second noise eliminating circuit 23b, and at the output of this second noise eliminating circuit 29b there appears a luminance signal as shown in FIG. 17(d), which is formed by eliminating the noises superimposed on the back porch portion.

Figure 18:
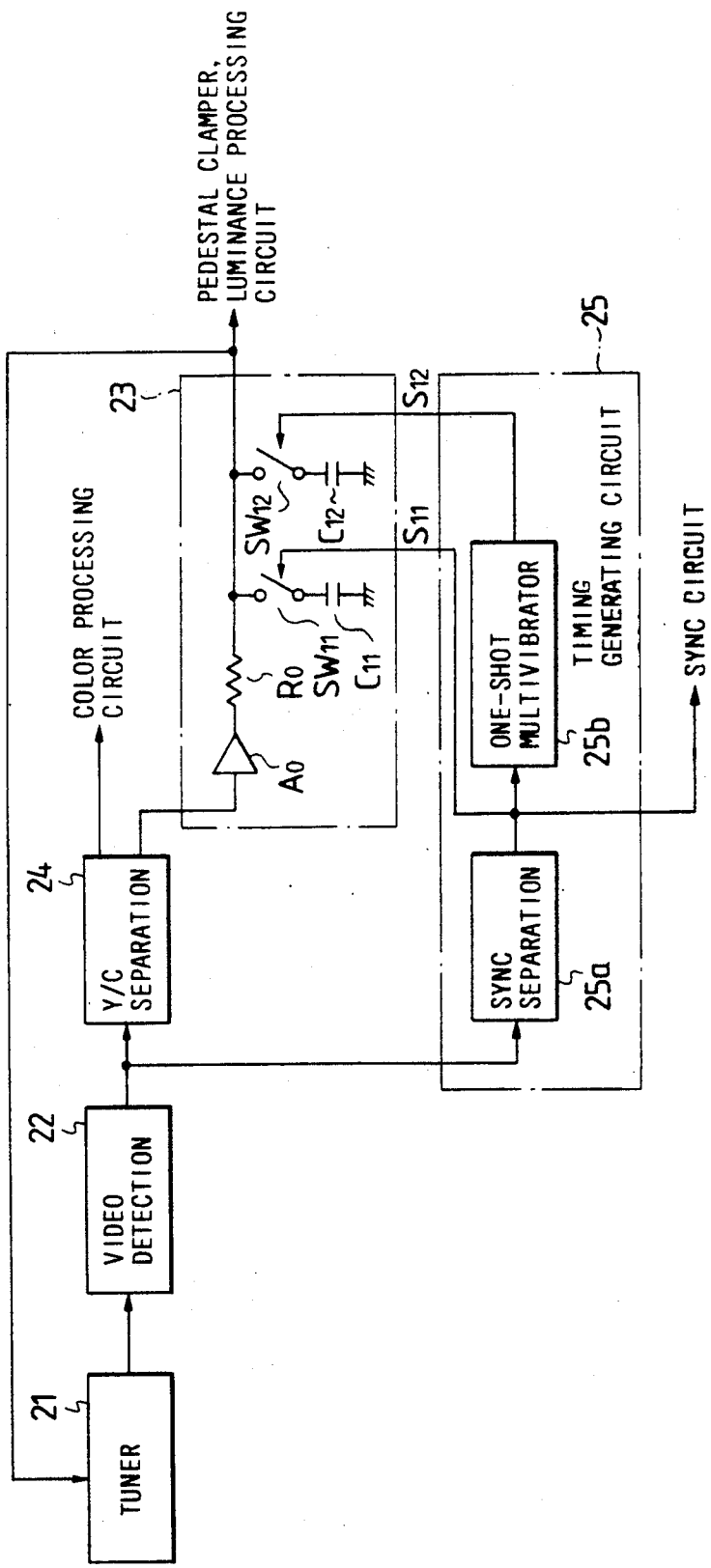
FIG. 18 is a block diagram for explaining a second embodiment of video equipment.

FIG. 18 illustrates a second embodiment according to the second aspect of the present invention, and the same parts as those in FIG. 15 are represented with the same reference numbers. In this embodiment, the system is provided with a noise eliminating process circuit 23, which is composed of an amplifier $A_0$, a resistor $R_0$, capacitors $C_{11}$ and $C_{12}$, switches $SW_{11}$ and $SW_{12}$, and is set on the output side of a Y/C separating circuit 24. This noise eliminating process circuit 23 eliminates the noises superimposed on the synchronizing signal and the back porch of the luminance signal as separated by the Y/C separating circuit 24.

Figure 19:
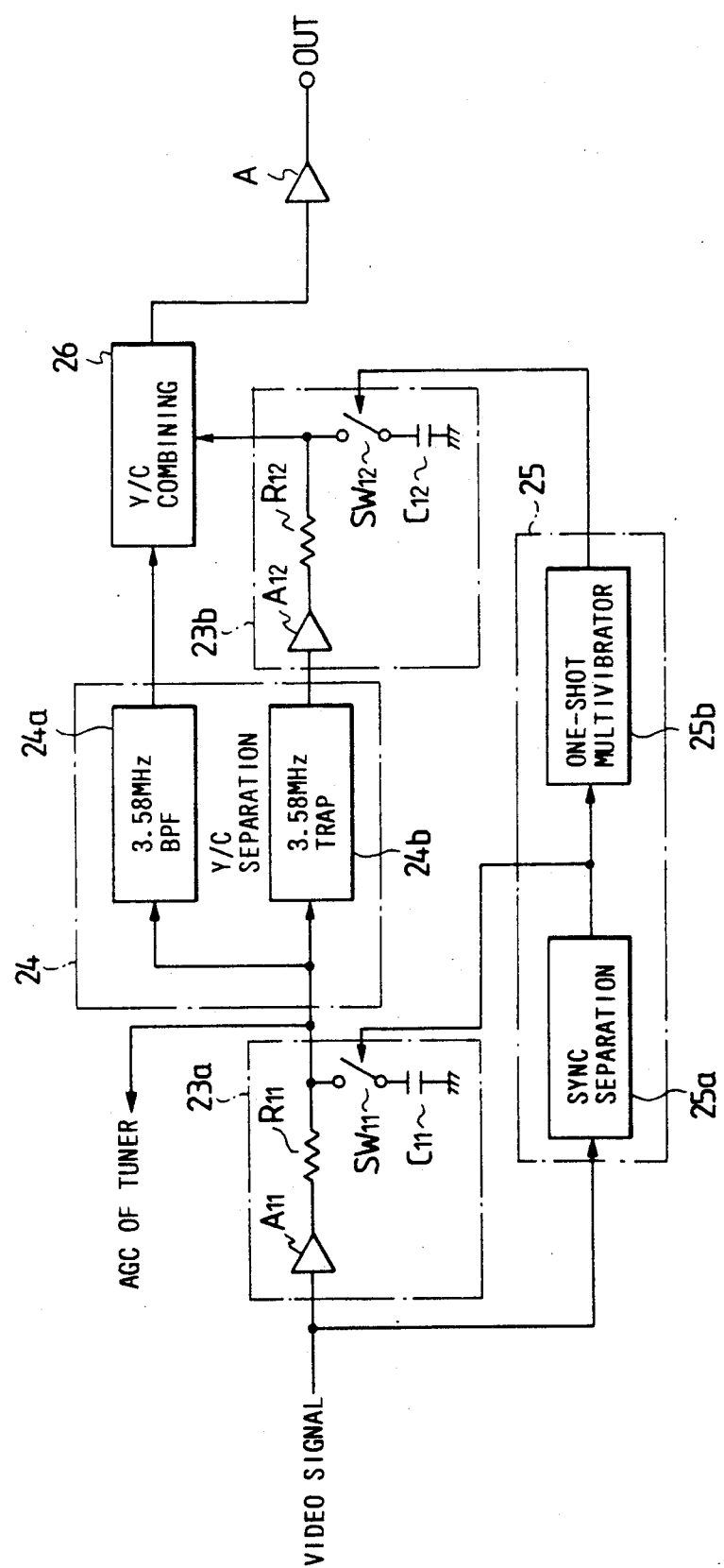
FIG. 19 is a block diagram showing a third embodiment of video equipment.

FIG. 19 illustrates principal parts of a VCR which is one embodiment of video equipment according to the present invention, and the parts which are the same as those in the embodiment of FIG. 15 are indicated with the same reference numbers.

A video signal from a tuner section or a reproducing section is input to a first noise eliminating circuit 23a in which the noises superimposed on the horizontal synchronizing signal are eliminated. Such a video signal that the noises have been eliminated from the horizontal synchronizing signal is sent to a Y/C separating circuit 24 composed of a 3.58 MHz BPF 24a and a 3.58 MHz trap 24b, and is separated into a color signal and a luminance signal in this circuit. The color signal separated by the Y/C separating circuit 24 is sent directly to a Y/C combining circuit 26, and the luminance signal is sent to the second noise eliminating circuit 23b, where the noises are eliminated from the back porch.

That is, the first and second noise eliminating circuits 23a and 23b together comprise a noise eliminating process circuit which eliminates the noises included in the synchronizing signal and the back porch, and this circuit is controlled with timing control signals from a timing generating circuit 25. The luminance signal from which the noises have been eliminated by the noise eliminating process circuit is input to the Y/C combining circuit 26, in which the luminance signals is combined with the color signal. The resultant signal so combined is sent via an amplifier A and an output terminal OUT to a television receiver or the like not illustrated in the figure. The first and second noise eliminating circuits 23a and 23b in this embodiment are identical to that shown in FIG. 15 except that these circuits are provided with amplifiers $A_{11}$ and $A_{12}$, respectively. Moreover, the first noise eliminating circuit 23a is not needed in a VDP not provided with an AGC circuit.

Figure 20:
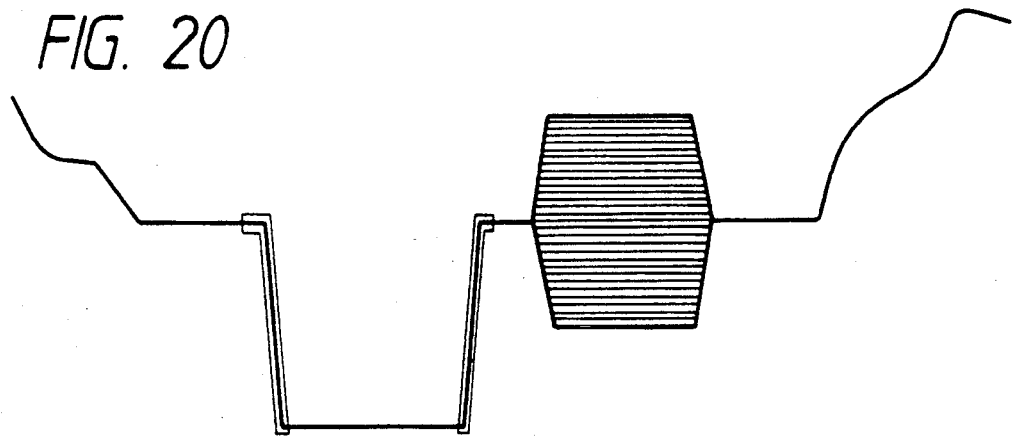
FIG. 20 is a waveform chart illustrating a video signal from which the noises have been eliminated by the equipment shown in FIG. 19.

In this embodiment, such a video signal that the noises have been eliminated from the DC part of the synchronizing signal and the back porch, as shown in FIG. 20, is sent to the output terminal OUT, when a video signal with noises N as shown in FIG. 17(a) is input to the system.

Figure 21:
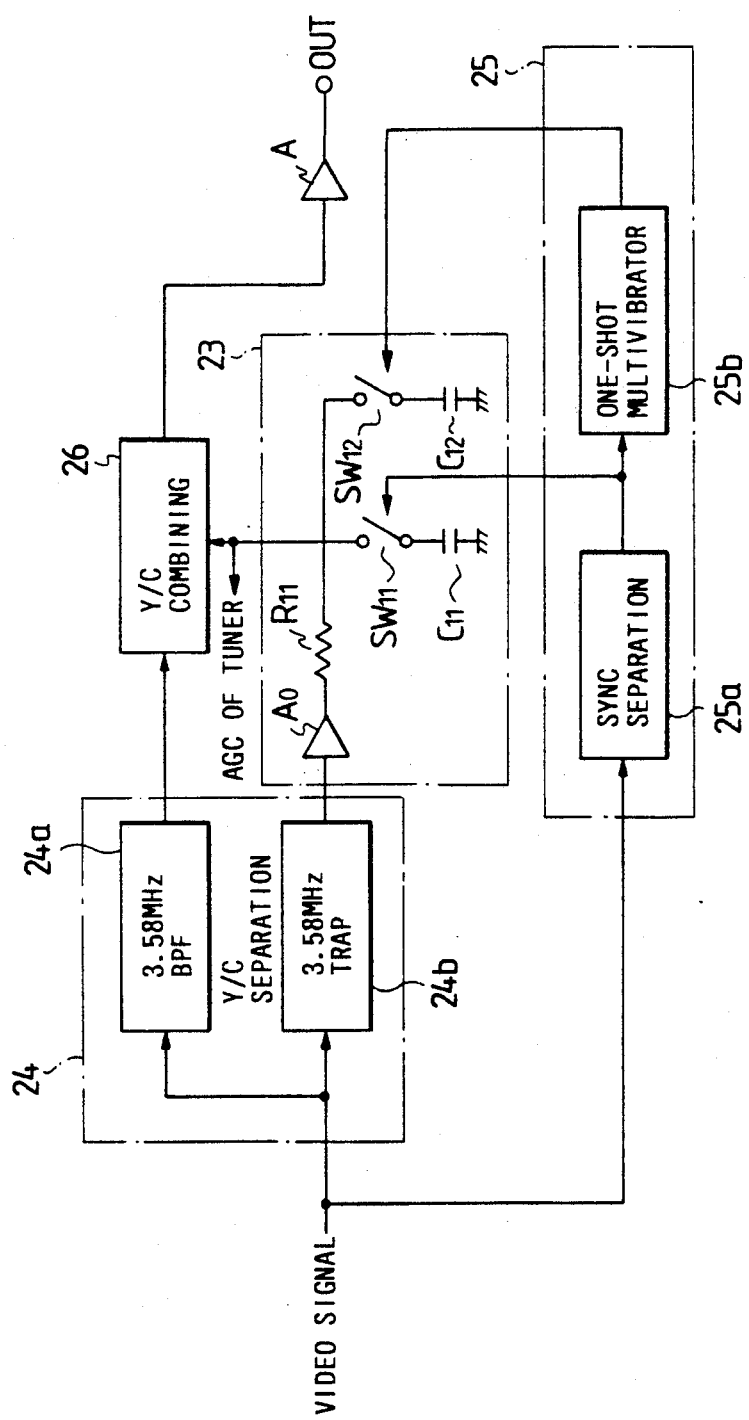
FIG. 21 is a block diagram illustrating a modification of the embodiment of the present invention shown in FIG. 19.

FIG. 21 illustrates a modified construction of the embodiment shown in FIG. 19, and the same parts as those in FIG. 19 are indicated by the same reference numbers. In this modification, a noise eliminating process circuit 23, which is composed of an amplifier $A_0$, a resistor $R_0$, capacitors $C_{11}$ and $C_{12}$, and switches $SW_{11}$ and $SW_{12}$, is provided between a Y/C separating circuit 24 and a Y/C combining circuit 26. This circuit 23 eliminates the noises superimposed on the DC part of the synchronizing signal and the back porch of the luminance signal separated by the Y/C separating circuit 24.

In the embodiments of FIGS. 15, 18, 19 and 21, the noises are eliminated by an integration circuit comprised of a resistor and a capacitor, but it is also feasible to replace the horizontal synchronizing signal and the pedestal portion (back porch portion) with a prescribed DC potential. FIG. 22 illustrates such an embodiment, and the same parts as those in FIG. 5 are indicated with the same reference numbers. In this embodiment, a luminance signal separated by a Y/C separating circuit 24 is sent out to a level clamping circuit 27, which clamps the pedestal level. This pedestal clamping circuit 27 is the circuit for maintaining the DC level of the video signals at a certain constant potential on the basis of a DC level immediately subsequent to the color burst signal in the baseband signal. The luminance signal whose DC level is thus maintained at a constant potential by the pedestal clamping circuit 27 is sent to a noise eliminating process circuit 23'.

The noise eliminating process circuit 23' is provided with switches $SW_{21}$ and $SW_{21}'$ which are complementarily turned on by the effect of an inverter $I_2$ in response to a timing control signal $S_{11}$, switches $SW_{22}$ and $SW_{22}'$ which are complementarily turned on by the effect of an inverter $I_3$ in response to a timing control signal $S_{12}$, a first voltage generator $E_1$ which generates a voltage that is lower by a certain constant voltage value than the pedestal level, and a second voltage generator $E_2$ which generates a voltage corresponding to the level of the pedestal level. This noise eliminating process circuit 23' replaces the DC part of the horizontal synchronizing signal and the pedestal portion with the respective prescribed voltages by controlling the on and off operations of the switches $SW_{21}$ through $SW_{22}'$ with the timing control signals $S_{11}$ and $S_{12}$, thereby eliminating the noises superimposed on those portions.

In this regard, as shown in FIG. 12, the video signal is set in such a way that the pedestal level will be 0 IRE (the unit of the video signal level), that the maximum level of the video signal will be 100 IRE, and that the DC part of the horizontal synchronizing signal will be $-40$ IRE. Therefore, the DC part of the horizontal synchronizing signal will be at the potential level lower by 0.57 V than the pedestal level when the peak-to-peak amplitude of the video signal is set at 2 $V_{P-P}$ as shown in FIG. 12. This value (0.57 $V_{P-P}$) is a value approximately equal to the base-emitter voltage $V_{BE}$ of transistors.

Figure 23:
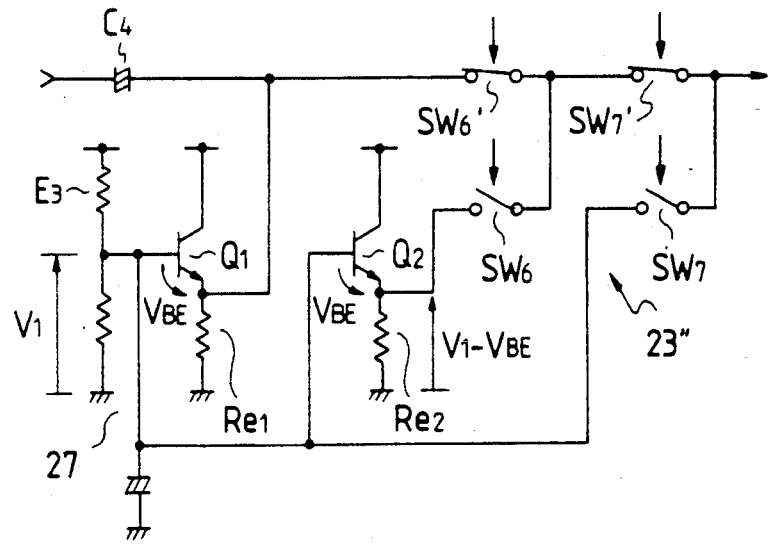
FIG. 23 is a circuit diagram showing a modification including changes in some parts of the diagram shown in FIG. 22.

Therefore, the level clamping circuit 27 and the noise eliminating process circuit 23' mentioned above can be combined into a circuit construction shown in FIG. 23. In FIG. 23, a level clamping circuit 27 is comprised of a voltage generator $E_3$, a transistor $Q_1$ to the base of which a voltage $V_1$ generated by this voltage generator $E_3$ is applied, and an emitter resistor $R_{e1}$. The level clamping operation is performed by constantly feeding the emitter voltage $(V_1-V_{BE})$ from the transistor $Q_1$ to the video signal line to which the luminance signal is input via a coupling capacitor $C_4$. A noise eliminating process circuit 23" has a transistor $Q_2$ to the base of which the voltage $V_1$ generated by the voltage generator $E_3$ in the level clamping circuit 7 is applied, and an emitter resistor $R_{e2}$. With the construction described above, the emitter voltage $(V_1-V_{BE})$ of the transistor $Q_2$ is substituted for a synchronizing signal by turning off the switch $SW_6'$ and turning on the switch $SW_6$ with the timing control signal $S_{11}$ generated in the synchronizing signal period, and the voltage $V_1$ generated by the voltage generator $E_3$ is substituted for the back porch portion by turning off the switch $SW_7'$ and turning on the switch $SW_7$ with the timing control signal $S_{12}$ kept at a high level during the back porch period.

It is noted that the video signal of 2 $V_{P-P}$ is converted into a video signal of 1 $V_{P-P}$ by terminating it with a resistor of 75 Ohms.

Furthermore, the construction in the combination of the level clamping circuit 27 and the noise eliminating process circuit 23' or 23" in FIG. 22 and FIG. 23 can be applied also to such video equipment as VCR and VDP. In such a case, however, the luminance signal from which the noises have been eliminated by the noise eliminating process circuit 23' or 23" will be output after it is combined with the color signal in a Y/C combining circuit.

Figure 24:
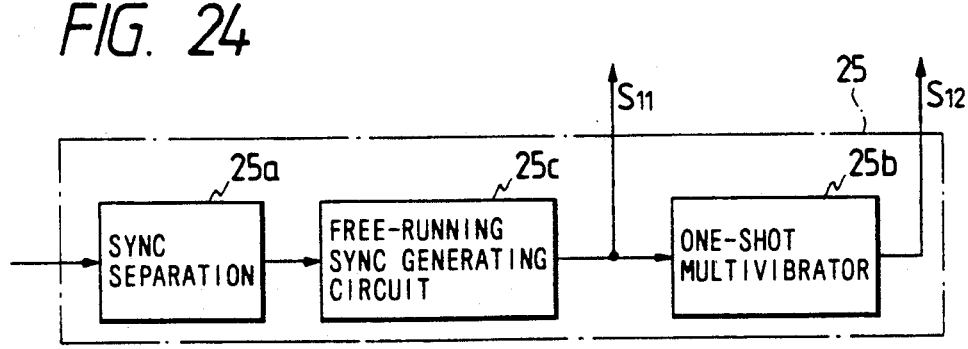
FIG. 24 is a chart showing a modification of a timing generating circuit in the embodiments illustrated in FIG. 15, etc.

The timing generating circuit 25 in the embodiments explained above is composed of a synchronization separating circuit 25a and a one-shot multivibrator circuit 25b. This can be changed to a construction as illustrated in FIG. 24. In FIG. 24, a free-running synchronization generating circuit 25c is inserted between the synchronization separating circuit 25a and the one-shot multivibrator circuit 25b. This free-running synchronization generating circuit 25c makes it possible to eliminate the jitters due to the noises included in the horizontal synchronizing signal, since this circuit generates on a free-running basis the horizontal synchronizing signals during one vertical synchronizing period by counting the horizontal synchronizing signals in the vertical synchronizing signal which has been separated by the synchronization separating circuit 25a.

As described in the foregoing, the equipments according to the second aspect of the present invention is capable of eliminating the noises superimposed on the synchronizing signal of the video signal, thereby offering the advantage that the AGC voltage of the AGC circuit in the television receiver will not be liable to fluctuations due to such noises and that the picture quality on the screen will not be deteriorated in consequence of the luminance fluctuations in the form of fine streaks running in the horizontal direction on the screen.

Furthermore, the equipment according to the present invention is capable of eliminating the noises superimposed on the back porch portion of the video signal, offering the advantage that the reference for the luminance of the television receiver will not be affected by fluctuations due to such noises and that the picture quality will not be deteriorated in consequence of the appearance of dark streaks in the horizontal direction on the screen.

What is claimed is:

1. In a CATV terminal apparatus detecting a radio frequency video signal transmitted through a transmission line, converting the detected signal into a baseband video signal, and modulating the converted signal into an output radio frequency video signal, the improvement comprising:
   first noise eliminating means for eliminating a noise superimposed on a DC part of a horizontal synchronizing signal portion of the baseband video signal by integrating the DC part.

2. In a CATV terminal apparatus detecting a radio frequency video signal transmitted through a transmission line, converting the detected signal into a baseband video signal, and modulating the converted signal into an output radio frequency video signal, the improvement comprising:
   separating means for separating the baseband signal into a color signal and a luminance signal; and
   noise eliminating means for eliminating a noise superimposed on a back porch portion of the luminance signal by integrating the back porch portion.

3. The CATV terminal apparatus according to claim 1, further comprising:
   separating means for separating a baseband video signal from the first noise eliminating means into a color signal and a luminance signal; and
   second noise eliminating means for eliminating a noise superimposed on a back porch portion of the luminance signal by integrating the back porch portion.

4. In a CATV terminal apparatus detecting a radio frequency video signal transmitted through a transmission line, converting the detected signal into a baseband video signal, and modulating the converted signal into an output radio frequency video signal, the improvement comprising:
   separating means for separating the baseband video signal into a color signal and a luminance signal;
   first noise eliminating means for eliminating a noise superimposed on a DC part of a horizontal synchronizing signal portion of the luminance signal by integrating the DC part; and
   second noise eliminating means for eliminating a noise superimposed on a back porch portion of the luminance signal by integrating the back porch portion.

5. In a CATV terminal apparatus detecting a radio frequency video signal transmitted through a transmission line, converting the detected signal into a baseband video signal, and modulating the converted signal into an output radio frequency video signal, the improvement comprising:
   separating means for separating the baseband signal into a color signal and a luminance signal; and
   noise eliminating process means for eliminating a noise superimposed on a back porch portion of the luminance signal by replacing the back porch portion with a predetermined constant voltage.

6. In a CATV terminal apparatus detecting a radio frequency video signal transmitted through a transmission line, converting the detected signal into a baseband video signal, and modulating the converted signal into an output radio frequency video signal, the improvement comprising:
   first noise eliminating means for eliminating a noise superimposed on a DC part of a horizontal synchronizing signal portion of the baseband video signal by replacing the DC part with a first predetermined constant voltage;
   separating means for separating a baseband video signal from the first noise eliminating means into a color signal and a luminance signal; and
   second noise eliminating means for eliminating a noise superimposed on a back porch portion of the luminance signal by replacing the back porch with a second predetermined constant voltage.

7. In a CATV terminal apparatus detecting a radio frequency video signal transmitted through a transmission line, converting the detected signal into a baseband video signal, and modulating the converted signal into an output radio frequency video signal, the improvement comprising:
   separating means for separating the baseband video signal into a color signal and a luminance signal;
   first noise eliminating means for eliminating a noise superimposed on a DC part of a horizontal synchronizing signal of the luminance signal portion by replacing the DC part with a first predetermined constant voltage; and
   second noise eliminating means for eliminating a noise superimposed on a back porch portion of the luminance signal by replacing the back porch portion with a second predetermined constant voltage.

8. In a CATV terminal apparatus receiving a scrambled video signal and descrambling the received video signal, the improvement comprising:

first noise eliminating means for eliminating a noise superimposed on a DC part of a horizontal synchronizing signal portion of a descrambled video signal by integrating the DC part.

9. In a CATV terminal apparatus receiving a scrambled video signal and descrambling the received video signal, the improvement comprising:

separating means for separating a descrambled video signal into a color signal and a luminance signal; and noise eliminating means for eliminating a noise superimposed on a back porch portion of the luminance signal by integrating the back porch portion.

10. The CATV terminal apparatus according to claim 8, further comprising:

separating means for separating a video signal from the first noise eliminating means into a color signal and a luminance signal; and second noise eliminating means for eliminating a noise superimposed on a back porch portion of the luminance signal by integrating the back porch portion.

11. In a CATV terminal apparatus receiving a scrambled video signal and descrambling the received video signal, the improvement comprising:

separating means for separating the video signal into a color signal and a luminance signal;

first noise eliminating means for eliminating a noise superimposed on a DC part of a horizontal synchronizing portion of the luminance signal by integrating the DC part; and second noise eliminating means for eliminating a noise superimposed on a back porch portion of the luminance signal by integrating the back porch portion.

12. In a CATV terminal apparatus receiving a scrambled video signal and descrambling the received video signal, the improvement comprising:

separating means for separating a descrambled video signal into a color signal and a luminance signal; and noise eliminating process means for eliminating a noise superimposed on a back porch portion of the luminance signal by replacing the back porch portion with a predetermined constant voltage.

13. In a CATV terminal apparatus receiving a scrambled video signal and descrambling the received video signal, the improvement comprising:

first noise eliminating means for eliminating a noise superimposed on a DC part of a horizontal synchronizing signal portion of a descrambled video signal by replacing the DC part with a first predetermined constant voltage;

separating means for separating a video signal from the first noise eliminating means into a color signal and a luminance signal; and second noise eliminating means for eliminating a noise superimposed on a back porch portion of the luminance signal by replacing the back porch portion with a second predetermined constant voltage.

14. In a CATV terminal apparatus receiving a scrambled video signal and descrambling the received video signal, the improvement comprising:

separating means for separating a descrambled video signal into a color signal and a luminance signal;

first noise eliminating means for eliminating a noise superimposed on a DC part of a horizontal synchronizing signal portion of the luminance signal by replacing the DC part with a first predetermined constant voltage; and second noise eliminating means for eliminating a noise superimposed on a back porch of the luminance signal by replacing the back porch portion with a second predetermined constant voltage.

15. In a video apparatus receiving a video signal and reproducing a signal corresponding to the received video signal, the improvement comprising:

first noise eliminating means for eliminating a noise superimposed on a DC part of a horizontal synchronizing signal portion of the video signal by integrating the DC part.

16. In a video apparatus receiving a video signal and reproducing a signal corresponding to the received video signal, the improvement comprising:

separating means for separating a the video signal into a color signal and a luminance signal; and noise eliminating process means for eliminating a noise superimposed on a back porch portion of the luminance signal by integrating the back porch portion.

17. The video apparatus according to claim 15, further comprising:

separating means for separating a video signal from the first noise eliminating means into a color signal and a luminance signal; and second noise eliminating means for eliminating a noise superimposed on a back porch portion of the luminance signal by integrating the back porch portion.

18. In a video apparatus receiving a video signal and reproducing a signal corresponding to the received video signal, the improvement comprising:

separating means for separating the video signal into a color signal and a luminance signal;

first noise eliminating means for eliminating a noise superimposed on a DC part of a horizontal synchronizing signal portion of the luminance signal by integrating the DC part; and second noise eliminating means for eliminating a noise superimposed on a back porch portion of the luminance signal by integrating the back porch portion.

19. In a video apparatus receiving a video signal and reproducing a signal corresponding to the received video signal, the improvement comprising:

separating means for separating the video signal into a color signal and a luminance signal; and noise eliminating process means for eliminating a noise superimposed on a back porch portion of the luminance signal by replacing the back porch portion with a predetermined constant voltage.

20. In a video apparatus receiving a video signal and reproducing a signal corresponding to the received video signal, the improvement comprising:

first noise eliminating means for eliminating a noise superimposed on a DC part of a horizontal synchronizing signal portion of the video signal by replacing the DC part with a first predetermined constant voltage;

separating means for separating a video signal from the first noise eliminating means into a color signal and a luminance signal; and second noise eliminating means for eliminating a noise superimposed on a back porch of the luminance signal by replacing the back porch portion with a second predetermined constant voltage.

21. In a video apparatus receiving a video signal and reproducing a signal corresponding to the received video signal, the improvement comprising:

separating means for separating the video signal into a color signal and a luminance signal;

first noise eliminating means for eliminating a noise superimposed on a DC part of a synchronizing signal portion of the luminance signal by replacing the DC part with a first predetermined constant voltage; and second noise eliminating means for eliminating a noise superimposed on a back porch portion of the luminance signal by replacing the back porch portion with a second predetermined constant voltage.

* * * * *